US012775940B2

(12) United States Patent
Ravinathan et al.

(10) Patent No.: US 12,775,940 B2
(45) Date of Patent: Oct. 27, 2026

(54) PAYMENT PROCESSOR SUPPORTED WEB 3.0 WALLETS

(71) Applicant: MASTERCARD ASIA/PACIFIC PTE. LTD., Singapore (SG)

(72) Inventors: Srinath Ravinathan, Singapore (SG); Donghao Huang, Singapore (SG); Shi Ler Shila Chew, Singapore (SG); Dendy Gunawan, Singapore (SG); Matthew T. Ordman, St. Louis, MO (US)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 133 days.

(21) Appl. No.: 18/237,728

(22) Filed: Aug. 24, 2023

(65) Prior Publication Data

US 2025/0069070 A1 Feb. 27, 2025

(51) Int. Cl.
*G06Q 20/38* (2012.01)
*G06Q 20/36* (2012.01)
*G06Q 20/40* (2012.01)

(52) U.S. Cl.
CPC ......... *G06Q 20/3823* (2013.01); *G06Q 20/36* (2013.01); *G06Q 20/381* (2013.01); *G06Q 20/3821* (2013.01); *G06Q 20/3827* (2013.01); *G06Q 20/401* (2013.01); *G06Q 2220/00* (2013.01)

(58) Field of Classification Search
CPC .. G06Q 20/3823; G06Q 20/36; G06Q 20/381; G06Q 20/3821; G06Q 20/3827; G06Q 20/401; G06Q 2220/00; G06Q 20/12; G06Q 20/322; G06Q 20/02; G06Q 20/065; G06Q 20/34; G06Q 20/42
See application file for complete search history.

(56) References Cited

U.S. PATENT DOCUMENTS

| | | | | |
|---|---|---|---|---|
| 10,108,938 | B1 * | 10/2018 | Brock | G06Q 20/065 |
| 12,169,868 | B2 * | 12/2024 | Navarro | G06Q 20/405 |
| 12,217,263 | B2 * | 2/2025 | Pandillapalli | G06Q 40/03 |
| 12,229,761 | B1 * | 2/2025 | Ferenczi | G06Q 20/387 |
| 2001/0032878 | A1 * | 10/2001 | Tsiounis | G06Q 20/18 235/379 |

(Continued)

FOREIGN PATENT DOCUMENTS

| | | | |
|---|---|---|---|
| CN | 115345729 | A | 11/2022 |
| WO | 2023039344 | A1 | 3/2023 |

OTHER PUBLICATIONS

International Search Report and Written Opinion issued in International Application No. PCT/SG2024/050522, mailed Nov. 8, 2024, 10 pages.

*Primary Examiner* — Yingying Zhou
(74) *Attorney, Agent, or Firm* — Talem IP Law, LLP

(57) ABSTRACT

Systems and techniques for payment processor supported Web 3.0 ("web3") wallets are provided. The described systems and techniques allow for the use of non-fungible tokens (NFTs) to represent a payment token for making a payment inside a web3 and metaverse environment. Indeed, the described systems and techniques provide a financial NFT enabled representation of a payment card account as a token in a blockchain network, which can then be used to facilitate web3 payments with real-time fiat to crypto exchanges.

20 Claims, 19 Drawing Sheets

(56) References Cited

U.S. PATENT DOCUMENTS

| | | | | |
|---|---|---|---|---|
| 2015/0220928 | A1* | 8/2015 | Allen | G06Q 20/10<br>705/67 |
| 2017/0300879 | A1* | 10/2017 | Subramanian | G06Q 20/00 |
| 2020/0118139 | A1* | 4/2020 | Kalvit | G06Q 20/4018 |
| 2020/0302459 | A1* | 9/2020 | Chepe | G07G 1/0036 |
| 2021/0304197 | A1* | 9/2021 | Pomassl | G06Q 20/3223 |
| 2022/0300918 | A1* | 9/2022 | Yan | G06Q 20/4037 |
| 2023/0144486 | A1* | 5/2023 | Bono | G06Q 20/02<br>705/39 |
| 2023/0186285 | A1* | 6/2023 | Mawson | G06Q 20/381<br>705/40 |
| 2023/0230065 | A1* | 7/2023 | Yan | G06Q 20/36<br>705/41 |
| 2023/0385815 | A1* | 11/2023 | Jakobsson | G06Q 20/36 |
| 2024/0161090 | A1* | 5/2024 | Fang | G06Q 20/3674 |

* cited by examiner

PAYMENT PROCESSOR SUPPORTED WEB 3.0 WALLETS

BACKGROUND

Web 3.0 ("web3") wallets, or crypto wallets, allow users to store and manage their digital assets, such as cryptocurrencies, non-fungible tokens (NFTs), and other digital assets. With the rise of decentralized applications (dApps), the demand for web3 wallets has increased. Web3 wallets are digital wallets that store private keys, which are used to access and manage the digital assets. When a user creates a web3 wallet, the user is given a unique private key which is used to prove ownership of their digital assets. This private key is then used to generate a corresponding public key, which can be used to verify the authenticity of transactions. By using these keys together, a web3 wallet can enable digital identity and prove ownership of digital assets in a secure and decentralized way.

BRIEF SUMMARY

Systems and techniques for payment processor supported Web 3.0 ("web3") wallets are provided. The described systems and techniques allow for the use of non-fungible tokens (NFTs) to represent a payment token for making a payment inside a web3 and metaverse environment. Indeed, the described systems and techniques provide a financial NFT enabled representation of a payment card account as a token in a blockchain network, which can then be used to facilitate web3 payments with real-time fiat to crypto exchanges.

A payment service provider (PSP) can receive, from a web3 wallet of a first party, a cryptocurrency transaction amount for a transaction between the first party and a second party, a public address of the second party, and a financial card non-fungible token (NFT) of the first party to be used for payment of the transaction; and identify the financial NFT as representing a tokenized payment card of an issuer. The PSP can obtain an estimated exchange amount in fiat currency required for the cryptocurrency transaction amount where the estimated exchange amount comprises an estimated gas fee; communicate, to the issuer, a pre-authorization request for a pre-authorization of the estimated exchange amount; and receive, from the issuer, a pre-authorization response message that includes the pre-authorization for the estimated exchange amount. The PSP can generate a transaction payload by obtaining payment credentials for the financial NFT; and communicate, to the web3 wallet, the transaction payload. The PSP can receive a transaction hash indicating the transaction payload is signed; in response to receiving the transaction hash, the PSP can obtain a confirmation of a fiat currency to cryptocurrency exchange of the estimated exchange amount, the confirmation comprising an actual exchange amount and the actual exchange amount comprising an actual gas fee; communicate, to the issuer, a capture request of the pre-authorization for the actual exchange amount; receive, from the issuer, a capture response message that the fiat currency of the actual exchange amount is captured; and provide, to the second party, a confirmation message including a payment transaction hash for a transfer of the cryptocurrency transaction amount for the transaction to the public address of the second party.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
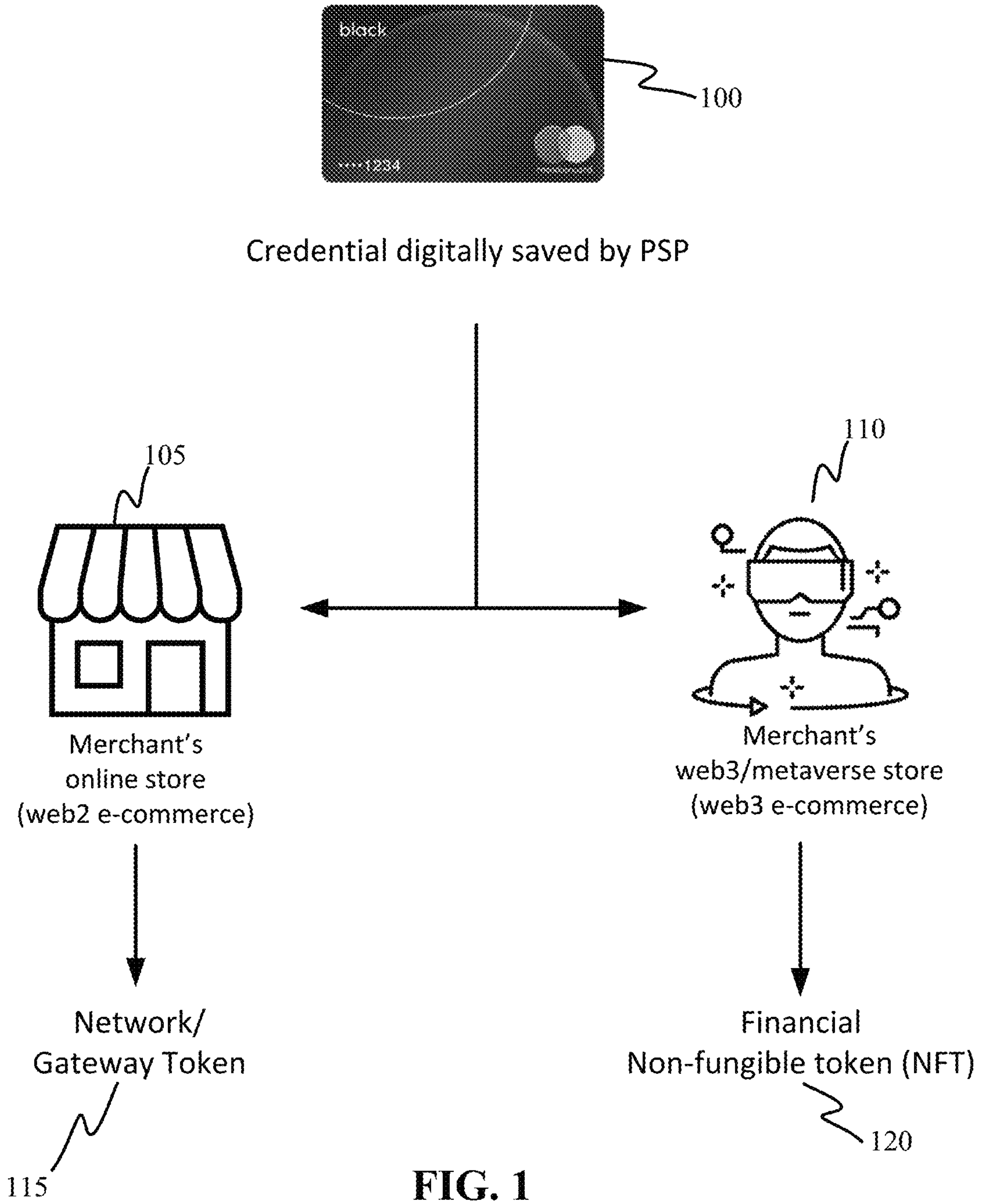
FIG. 1 illustrates an example conceptual diagram illustrating use of a payment card.

Systems and techniques for payment processor supported web3 wallets are provided. The described systems and techniques allow for the use of NFTs to represent a payment token for making a payment inside a web3 and metaverse environment. Indeed, the described systems and techniques provide a financial NFT enabled representation of a payment card account as a token in a blockchain network, which can then be used to facilitate web3 payments with real-time fiat to crypto exchanges.

Current web3 wallets allow only native web3 payments. Through the described systems and techniques, NFT tokenization can be built on top of EMV cryptography, which has successfully transitioned from physical, to contactless, to digital, and mobile wallets. Indeed, through the payment processor supported web3 wallets, financial NFTs for any stored network credentials can be used alongside traditional payment tokens. Advantageously, cardholders can tokenize a payment card as a financial NFT using web3; and a PSP can digitally store the financial NFT to enable seamless payments both traditional e-commerce and in web3/metaverse e-commerce. Thus, allowing for reduced frictions for both consumers and merchants by enabling real time on demand fiat to cryptocurrency conversion and having a common acceptance and gateway solution.

Definitions

"Cryptocurrency" ("crypto") refers to a digital currency in which transactions are verified and records maintained by a decentralized system using cryptography, rather than by a centralized authority. Examples of cryptocurrency include Bitcoin, Ethereum, Tether, Solana, and Dogecoin.

"Fiat currency" refers to a government-issued currency that is not backed by a physical commodity, such as gold or silver, but rather by the government that issued it. Examples of fiat currency include, but are not limited to, the U.S. dollar, the British pound, the Indian rupee, and the euro.

A "native token" or "native currency" or "native crypto" is a blockchain's inherent digital currency. Examples of native tokens include, but are not limited to, the Ethereum blockchain's native token, Ether (ETH); the Binance Smart Chain's native token, Binance Coin (BNB); and Cardano's native token, ADA.

"Non-native tokens" are derivatives of a blockchain built to rely on the native token. An example of a non-native token is an ERC-20 token. ERC-20 tokens are sets of fungible digital tokens that live on the Ethereum network. ERC-20 refers to a technical standard that defines a common set of rules such as how the tokens can be transferred, how transactions are approved, and the total supply of tokens.

"Non-fungible tokens" ("NFTs") refer to digital tokens on a blockchain, each of which represents a distinct digital/physical asset. Each NFT is unique and cannot be swapped for another version of itself.

As used herein, a "financial NFT" refers to a publicly verifiable and non-transferable NFT that represents a tokenized payment card. Each financial NFT can be powered by, for example, ERC-721 smart contracts deployed on the supported blockchains. Each financial NFT has multiple on-chain data elements, such as, but not limited to, Token ID: unique identifier, Token URI: link to metadata, Hashed primary account number ("PAN"): one-way hash of PAN, and Status: active/inactive/blocked. Token metadata can be stored in peer-to-peer distributed file systems, e.g., InterPlanetary File System (IPFS) and can contain data elements (in JSON format) such as, but not limited to, name, description, image, and list of customized attributes.

An example code listing for a financial NFT includes:

```
{
    "name": "**** 3821",
        "description": "Payment Card, ending 3821",
        "image": "ipfs://QmWtmlnLSADTBhjUVmr4Hj9QWBnnxjSkk78DEb3uBJdQ8w",
        "attributes": [
      {
          "trait_type": "ownerAddress",
          "value": "0x507222b2eA12829882210ab5fb6d4868199d835e"
      },
      {
          "trait_type": "hashedPAN",
          "value":
"3145269513c69897a766b343be61736803a3f58904bc3c7c1ab51f5c72769b3a"
      },
      {
          "trait_type": "tokenAPI",
          "value": "https://card-nft.com/tokens"
      }
  ]
}
```

Payments with financial NFT are recorded in blockchain and transparent. That is, payment cards are tokenized as a financial NFT and put on the blockchain itself. Since the user owns the financial NFT, the user can generate a cryptogram that could be used on the existing payment card rails. The tokenization provides just a one-time token to the Web3/Metaverse merchant. Therefore, the financial NFT is more secure as the merchant does not have any payment data of the user.

"Tokenization" refers to the process of replacing a card's primary account number (PAN)—the 16-digit number on the plastic card—with a unique alternate card number, or "token." Tokens can be used for mobile point-of-sale transactions, in-app purchases or online purchases.

A "network token" is a token generated by network tokenization service providers such as Mastercard Digital Enablement Service, in exchange for the payer's PAN.

"Minting an NFT" refers to the process of publishing a digital asset on the blockchain.

A "smart contract" refers to a computer program that directly and automatically controls the transfer of digital assets between the parties under certain conditions.

"Metaverse" refers to a simulated digital environment that uses augmented reality (AR), virtual reality (VR), and blockchain.

A "web2 wallet" refers to a custodial digital wallet.

A "web3 wallet" or "crypto wallet" refers to a digital wallet that stores private keys, which are used to access and manage cryptocurrency and blockchain-based assets, such as NFTs. When a user creates a web3 wallet, the user is given a unique private key which is used to prove ownership of their digital assets. This private key is then used to generate a corresponding public key, which can be used to verify the authenticity of transactions. By using these keys together, a web3 wallet can enable digital identity and prove ownership of digital assets in a secure and decentralized way. Examples of a web3 wallet include, but are not limited to, a non-custodial wallet, a custodial wallet, and a smart contract wallet.

A "private key" refers to a secret piece of information that is used to prove ownership of digital assets. It is used to sign transactions that are sent to the blockchain, and it is only known to the owner of the digital assets.

A "public key" refers to a piece of information that is used to prove that a transaction was signed by the owner of a digital asset. It is used to verify the authenticity of transactions and can be shared publicly.

A "public address" can be derived from the public key and can be shared publicly, allowing others to send digital assets to the user's wallet. By providing a unique public address, a web3 wallet can enable digital identity and prove ownership of digital assets in a secure and decentralized way.

A "transaction identifier", or "transaction hash", is a unique string of characters providing proof that a transaction has been verified and added to the blockchain. The transaction hash can be used to provide confirmation that the transaction was made and to look up transaction details, such as, but not limited to, sending address, receiving address, amount, date and time, network fees, and confirmations.

A "decentralized application" ("dApp") refers to a type of distributed open-source software application that runs on a peer-to-peer (P2P) blockchain network rather than on a single computing device. DApps are built on a decentralized network that is supported by a blockchain distributed ledger. DApps allow users to interact with a public blockchain by, for example, swapping tokens and viewing NFTs.

A "distributed ledger" refers to decentralized database managed by multiple users, across multiple nodes.

A "payment processor" or "payment service provider" (PSP) refers to an entity on a payment gateway that assists businesses to accept electronic payments, such as credit cards and debit cards payments. PSPs act as intermediaries between those who make payments (e.g., consumers), and those who accept them (e.g., merchants). A PSP may be an acquiring bank or a third-party technology services provider.

A "crypto exchange" refers to an online trading platform that is used to buy, sell and exchange cryptocurrencies. The crypto exchange converts fiat currency (dollars, Euros, etc.) to crypto (Bitcoin, Ethereum, etc.), and vice versa.

A "merchant" refers to a provider of goods or services in exchange for payment. The merchant can be physically present at the sale or remote, such as an online retailer.

An "acquirer" refers to a party that processes payments on behalf of the merchant in a payment card transaction. The acquirer can be a bank system or other institution associated with the merchant.

An "issuer" refers to a bank system or other institution that provides payment cards to the cardholder.

The terms "user", "customer", and "consumer" are used interchangeably herein.

Currently there are no common acceptance and gateway solutions that serve both traditional e-commerce and emerging web3/metaverse e-commerce. There are now more than 12,000 cryptocurrencies, and the number more than doubled from 2021 to 2022, creating many challenges for both merchants and consumers. For merchants who do accept digital currencies, challenges arise in the fact that many consumers may not be web3 enabled. Further, merchants do not have a common payment gateway to accept digital currencies payment, and there is also a lack of integration across different wallet providers.

For consumers who do have web3 wallets, challenges arise in the fact that they may not have frictionless payment/e-commerce experiences. For example, in some cases, merchants may not accept the tokens that the consumer currently has in their web3 wallet. In some cases, the consumer may not have enough tokens in their web3 wallet and thus needs to perform a fiat-to-crypto exchange first. Currently, consumers must manually exchange for the different digital currencies accepted by the merchants and there is also no real-time exchange at the point of transaction.

Advantageously, the described systems and techniques extend existing payment processor capabilities to enable web3 via tokenized payment cards as financial NFTs enabling trust. Currently, a payment processor enables acceptance for standard web2 ecommerce merchants. The described systems and techniques provide a way to add support for web3/metaverse transactions on top of the already supported web2 transactions. Through the described systems and techniques, a payment processor can extend web3 ecommerce functionality to the same merchant by extending gateway tokenization to on-chain tokenization, partnering with issuers and/or crypto exchanges to enable conversion between fiat and cryptos, and leveraging Wallet Connect open-source protocol—an interoperable standard in web3. Advantageously, a merchant's pain points on accepting cryptos and a consumer's hassle of manually exchanging cryptos are addressed by this unconventional use of a payment processor as a common acceptance and gateway solution. Indeed, consumers do not have to switch context and can still make the web3/metaverse e-commerce payment through real or near real time exchange. This unconventional use of the payment processor as a common acceptance and gateway solution can also reduce the cart abandonment currently experienced by web3 merchants.

This disclosure recognizes and addresses, among other technical challenges, the complexity of providing common computer-implemented acceptance and gateway solutions that serve both traditional e-commerce and emerging web3/metaverse e-commerce.

The described systems and techniques can provide several improvements over existing technologies. For example, the additivity, robustness, generalizability, and customizability of the embodiments of the disclosure render the technologies described herein powerful and viable for application on various scenarios.

FIG. 1 illustrates an example conceptual diagram illustrating use of a payment card. Referring to FIG. 1, a single payment card (e.g., payment card 100) can be digitally saved by a payment processor (PSP) using the described payment processor supported web3 wallet and used for both web2 e-commerce transactions (e.g., at a merchant's online store 105) and web3/metaverse e-commerce transactions (e.g., at a merchant's web3/metaverse store 110).

As shown in FIG. 1, the credentials for the payment card 100 saved by the PSP for use in a web2 e-commerce transaction (e.g., at the merchant's online store 105) include a network/gateway token 115; and the credentials for the payment card 100 saved by the PSP for use in a web3 e-commerce transaction (e.g., at the merchant's web3/metaverse store 110) include a financial NFT 120.

The financial NFT 120 provides an unconventional form of tokenization for web3/metaverse e-commerce transactions (e.g., at a merchant's web3/metaverse store 110), which enables payments and customer engagement across both web3/metaverse and traditional channels.

A web2 native merchant supports crypto currency but accepts only fiat. Thus, the current payment method for web2 ecommerce transactions includes traditional payment options, such as online card payments.

A web3 native merchant accepts cryptocurrency. Thus, the current payment method for web3/metaverse e-commerce transactions is limited to proprietary coin/token belonging to that web3/metaverse blockchain. Even with using fiat currency, the web3/metaverse application provider is the one holding on to the payment data. These limit the users to only a specific ecosystem. Advantageously, through the described systems and techniques, a user can have the payment method securely tokenized across multiple blockchains via a financial NFT token. A financial NFT is unique and cannot be duplicated in the web3/metaverse crypto world. Thus, using the financial NFT token for payment would be greatly beneficial. For security, a user can revoke the financial NFT anytime.

As previously described, currently, to use an existing card payment on the web3/metaverse world, a user has to go to an exchange to first to top up their web3 wallet. Only then is the user able to make a payment via an existing payment card in the web3/metaverse world. Further, in a web3/ metaverse world, where everything is decentralized, there is no standard to make a real time exchange. Indeed, current crypto exchanges are not integrated with Web3/Metaverse payments. Advantageously, the described systems and techniques enable real-time payment card to crypto exchanges for web3/metaverse payments.

With the introduction of financial NFTs for any stored network credentials alongside traditional payment tokens, the footprint of existing payment processors can be expanded into web3 and the metaverse. Using the described payment processor supported web3 wallet, cardholders can tokenize their payment cards as financial NFTs, for example, by manual entry or through Click to Pay. The PSP digitally stores these credentials in databases and smart contracts, enabling seamless payments for consumers and Web3 merchants.

The PSP can support payment card transactions in both traditional web2 e-commerce and web3/metaverse e-commerce. Indeed, credentials for the same payment card can be stored by the PSP and used in both web2 transactions and web3/metaverse transactions. Advantageously, consumers can make a web3/metaverse e-commerce payment through real or near real time exchange without having to switch context.

Figure 2:
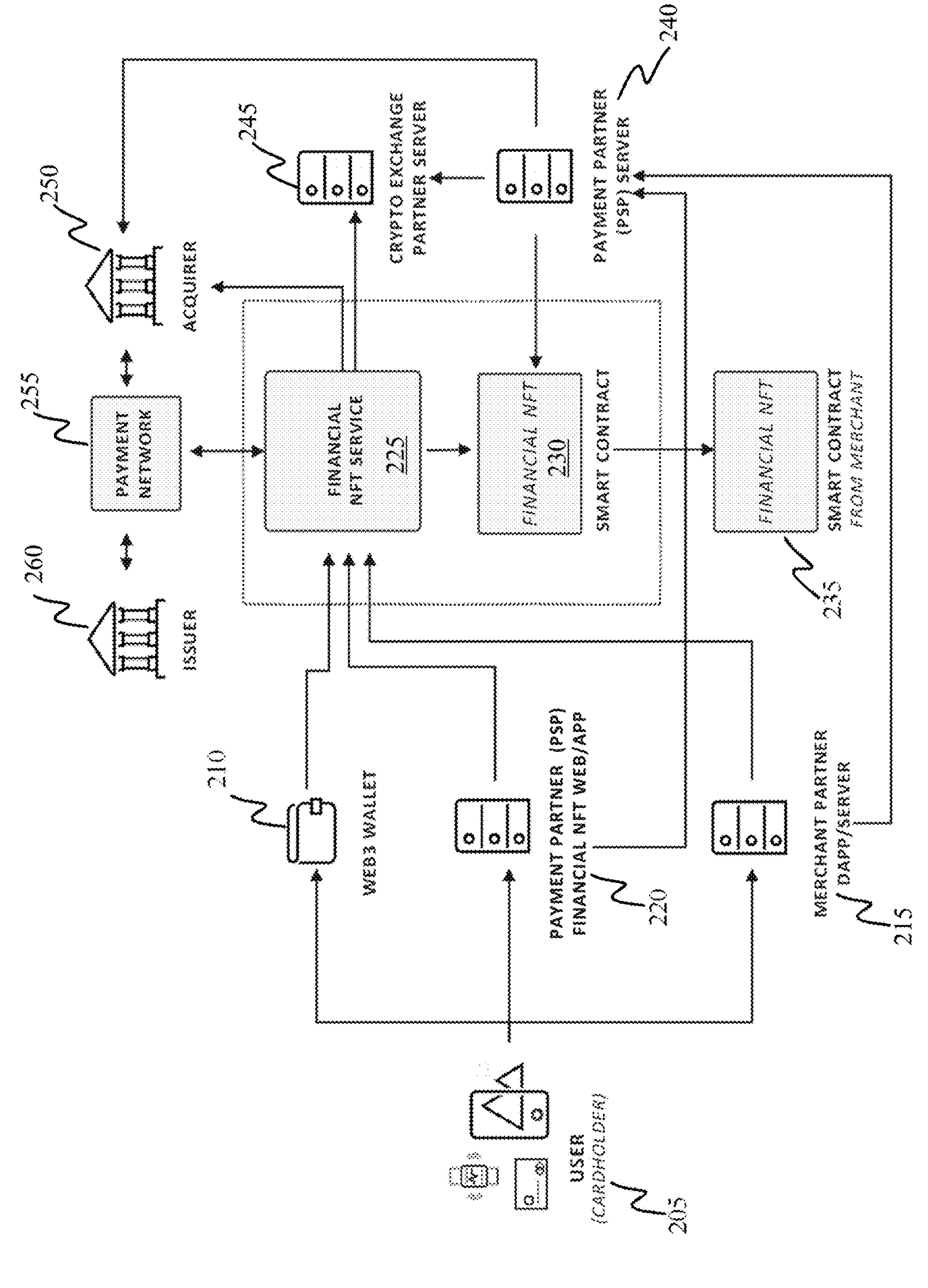
FIG. 2 illustrates an example operating environment in which various embodiments of the invention may be practiced.

FIG. 2 illustrates an example operating environment in which various embodiments of the invention may be practiced. Referring to FIG. 2, an example operating environment can include a user 205, a web3 wallet 210, a merchant dApp/server 215, a PSP application 220, one or more financial NFT services (e.g., financial NFT service 225), a financial NFT smart contract 230, a merchant financial NFT smart contract 235, PSP server 240, a crypto exchange server 245, an acquirer 250, a payment network 255, and an issuer 260.

The user 205 can communicate with the web3 wallet 210, the merchant dApp/server 215, or the PSP application 220 to mint a financial NFT or initiate a transaction, such as a web3 transaction.

In some cases, the financial NFT service 225 stores a mapping of the financial NFT token identification and payment credentials of the payment card represented by a financial NFT. In some cases, the PSP server 240 stores a mapping of the financial NFT token identification and payment credentials of the payment card represented by the financial NFT.

The financial NFT service 225 and the PSP server 240 can communicate with the crypto exchange server 245 to perform fiat to crypto exchanges. In some cases, the PSP server 240 maintains its own crypto balance and sets its own fiat/crypto conversion rate. In some cases, the financial NFT service 225 maintains its own crypto balance and sets its own fiat/crypto conversion rate.

The financial NFT service 225 and the PSP server 240 can communicate with the financial NFT smart contract 230. For example, the financial NFT service 225 can communicate with the financial NFT smart contract 230 to mint the financial NFT. The PSP server 240 can communicate with the financial NFT smart contract 230 in cases where the PSP server 240 initiates a transaction using their private key. Advantageously, this allows for the PSP server 240 to provide crypto acceptance to a merchant who is not crypto enabled.

The financial NFT smart contract 230 can communicate with the merchant financial NFT smart contract 235.

The financial NFT service 225 and the PSP server 240 can communicate with the issuer 260 via the acquirer 250 and the payment network 255.

With conventional on-chain transactions, the user of the payment card has to initiate the transaction with a smart contract on a blockchain, and that becomes problematic because the merchant then also has to interact with that smart contract. Advantageously, using the described systems and techniques, a merchant does not need to engage with the smart contract. Instead, the merchant needs to be able to communicate with a payment processor, which it already does.

Additionally, there are multiple levels of trust established through the described systems and techniques. One level of trust is established when the user tokenizes a payment card. The established trust is the trust that the issuer provides to the consumer by using two factor authentication is represented on the blockchain.

Another level of trust is when the merchant knows the payment processor using the financial NFT service performs a preauthorization and then signs a message and sends the message to the merchant to add to the transaction saying that it is verified that there are funds and will make this exchange.

Yet another level of trust established through the described systems and techniques can be embedded in the smart contract itself (e.g., the smart contract, the merchant smart contract, or even in a marketplace. For example, a third party can have a smart contract to sell NFTs to consumers (e.g., a merchant smart contract) and that kind of a smart contract address could be whitelisted within the financial NFT smart contract. Then when the consumer invokes that transaction through the financial NFT service, the consumer knows they are interacting with a whitelisted smart contract which is verified and vetted by a payment processor.

Components (computing systems, storage resources, and the like) in the operating environment may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as understood by those skilled in the art.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 3:
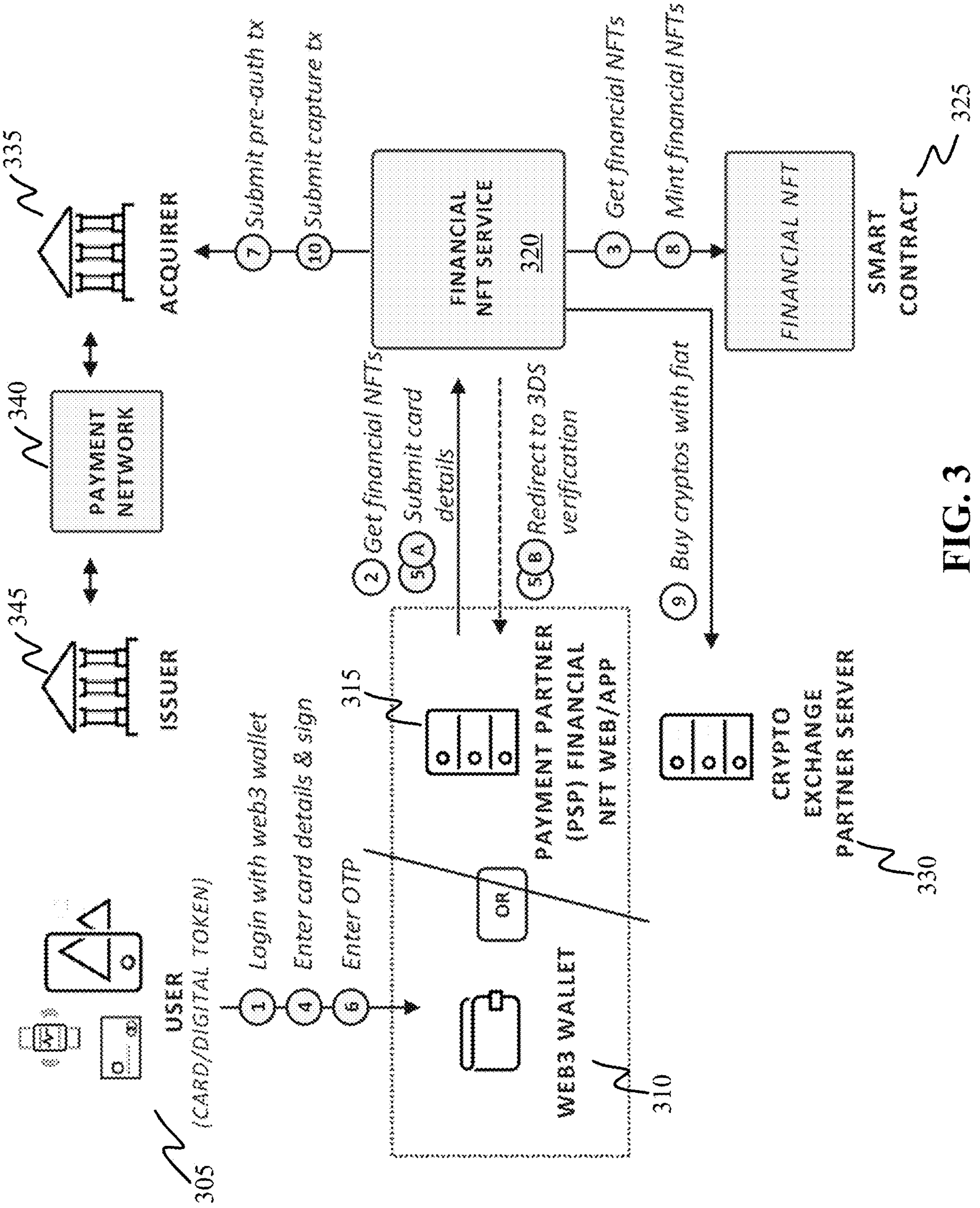
FIG. 3 illustrates an example operating environment and signal flow for minting a financial NFT according to an embodiment of the invention.

FIG. 3 illustrates an example operating environment and signal flow for minting a financial NFT according to an embodiment of the invention. Referring to FIG. 3, an example operating environment can include a user 305, a web3 wallet 310, a PSP hosted web application 315, one or more financial NFT services (e.g., financial NFT service 320), a financial NFT smart contract 325, a crypto exchange server 330, an acquirer 335, a payment network 340, and an issuer 345.

To begin the signal flow for minting a financial NFT, a user 305 can login to the web3 wallet 310, as shown in Step 1. In some cases, the user 305 can login to the PSP hosted web application 315. When the user 305 logs in, the web3 wallet 310 can obtain any financial NFTs associated with the user 305 from the financial NFT service 320, as shown in Step 2. The financial NFT service 320 communicates with the financial NFT smart contract 325 to provide the financial NFTs associated with the user 305, as shown in Step 3.

The user 305 can enter payment card details of the payment card to be minted to the web3 wallet 310 and electronically sign the minting transaction, as shown in Step 4. The web3 wallet 310 can submit the payment card details to the financial NFT service 320 with a request to validate the payment card and mint the financial NFT, as shown in Step 5A. The financial NFT service 320 can validate the payment card and authenticate the user 305, as shown in Step 5B. Here, the financial NFT service 320 can redirect to a 3D Secure (3DS) verification. A more detailed description of a validation of a payment card and authentication of a user is provided in FIG. 4. The user 305 can enter a one-time password (OTP) as part of the authentication, as shown in Step 6.

The financial NFT service 320 can determine a gas fee needed to mint the financial NFT. The gas fee is a fee required to successfully conduct a transaction on the blockchain. The gas fee can fluctuate and is determined at the time of the transaction. The gas fee is in cryptocurrency and the financial NFT service 320 can maintain a crypto balance to cover the gas fees needed to mint financial NFTs.

For each payment card minted as a financial NFT, the financial NFT service 320 can recover the gas fees by purchasing crypto and then charging the cost to the payment card. In this case, the financial NFT service 320 can determine an estimated exchange amount in fiat currency required for the amount of the gas fee. The financial NFT service 320 can then communicate a pre-authorization request for a pre-authorization of the estimated exchange amount to the issuer 345 (via the acquirer 335 and the payment network 340), as shown in Step 7.

Once the financial NFT service 320 receives a pre-authorization response message that includes the pre-authorization for the estimated exchange amount from the issuer 345 (via the acquirer 335 and the payment network 340), the financial NFT service 320 can then mint the financial NFT with the a financial NFT smart contract 325 (e.g., the a financial NFT smart contract 325 published the financial NFT), as shown in Step 8. Here, the financial NFT service 320 pays the gas fee on behalf of the user 305.

In some cases, the financial NFT service 320 stores a mapping of the financial NFT token identification and payment credentials of the payment card. In some cases, the PSP hosted web application 315 stores a mapping of the financial NFT token identification and payment credentials of the payment card.

The financial NFT service 320 can purchase cryptos in the amount of the gas fee from the crypto exchange server 330 in fiat currency (estimated exchange amount), as shown in Step 9. Here, the financial NFT service 320 can perform a fiat to crypto exchange, where the amount of fiat is the estimated exchange amount and the amount of crypto is the amount of the gas fee.

The financial NFT service 320 can then communicate a capture request of the pre-authorization for the estimated exchange amount to the issuer 345 (via the acquirer 335 and the payment network 340), as shown in Step 10. In cases where the financial NFT service 320 decides to absorb the costs for financial NFT minting gas fees, Step 7, Step 9, and Step 10 would not be needed.

The minting of a financial NFT described in FIG. 3 differs from the current web3 way of minting an NFT from a previously deployed smart contract. For example, the financial NFT is associated with a valid payment card, which is ensued by Step 4, Step 5A, Step 5B, Step 6, and Step 7. Additionally, the gas fee required for minting the financial NFT in Step 8, in native cryptocurrencies, is paid for by the financial NFT service 320. The financial NFT service 320 can recover the cost of the gas fee by charging the payment card associated with the financial NFT in fiat, which is described in Step 7 and Step 10.

Figure 4:
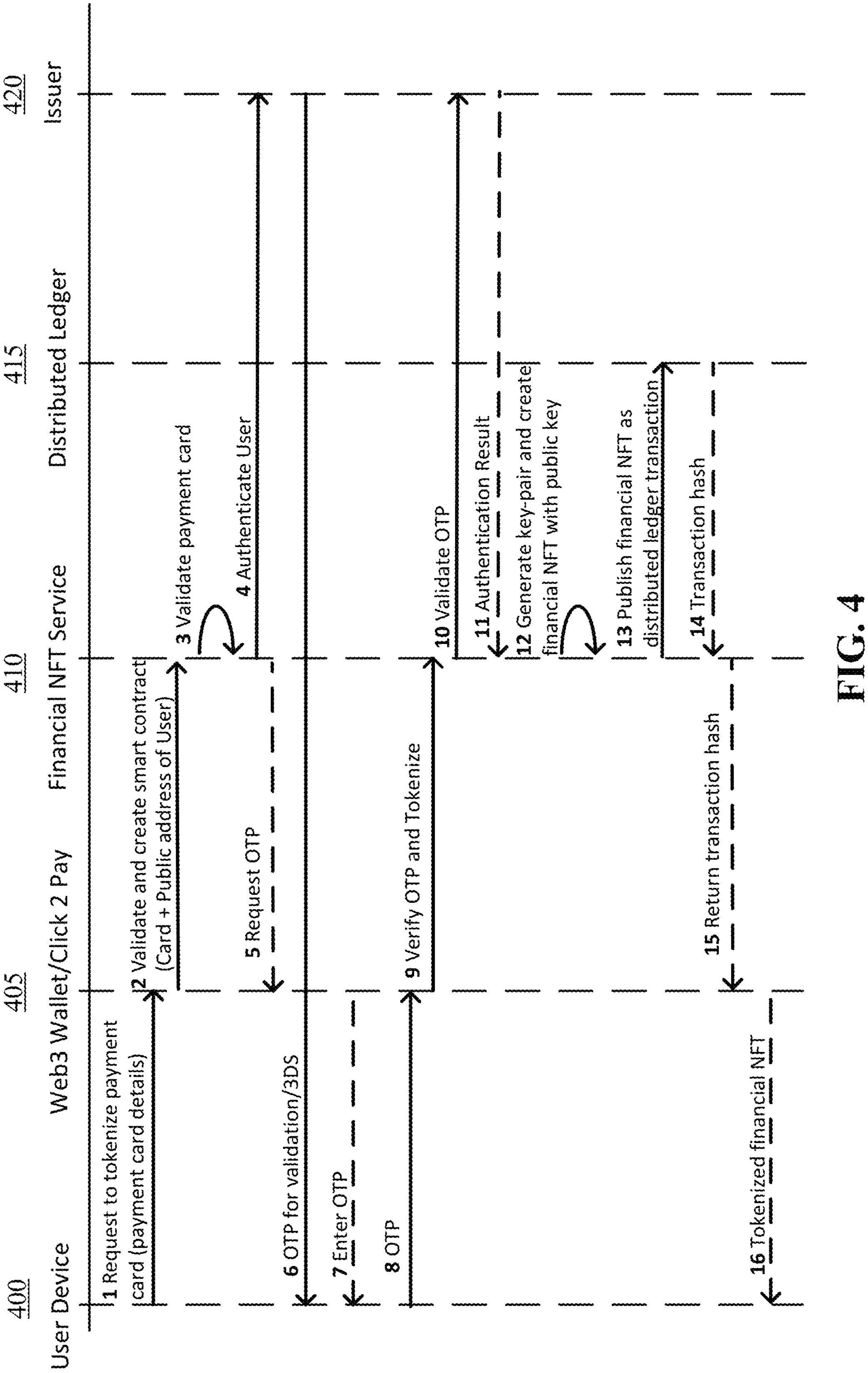
FIG. 4 illustrates an example sequence diagram for minting a financial NFT according to an embodiment of the invention.

FIG. 4 illustrates an example sequence diagram for minting a financial NFT according to an embodiment of the invention. With a financial NFT as a payment token, users can easily mint their card to the blockchain and utilize it whenever needed.

Referring to FIG. 4, the example sequence diagram can include a user 400, a web3 wallet/PSP web application 405, one or more financial NFT services (e.g., financial NFT service 410), a distributed ledger 415, and an issuer 420. In some cases, the web3 wallet/PSP web application 405 is a web3 wallet. In some cases, the web3 wallet/PSP web application 405 is a payment provider hosted web application.

To begin the sequence flow, a user 400 can request (flow 1) to tokenize a payment card. The request can include payment card details and is sent to the web3 wallet/PSP web application 405. The web3 wallet/PSP web application 405 can then send (flow 2) a request to the financial NFT service 410 to validate the payment card and create a smart contract. The request can include the payment card details and the public address of the user 400.

The financial NFT service 410 can then perform a two-factor authentication. The financial NFT service 410 can validate (flow 3) the payment card and send (flow 4) a request to the issuer 420 to authenticate the user 400. The financial NFT service 410 can communicate (flow 5) with the web3 wallet/PSP web application 405 to have the web3 wallet/PSP web application 405 request an OTP.

The issuer 420 can send (flow 6) the user 400 an OTP for validation/3DS and the web3 wallet/PSP web application 405 can request (flow 7) that the user 400 enter the OTP. The user 400 can provide (flow 8) the OTP sent by the issuer 420 to the web3 wallet/PSP web application 405 and the web3 wallet/PSP web application 405 can communicate (flow 9) a request to verify the received OTP and tokenize the payment card to the financial NFT service 410. The request can include the OTP received from the user 400.

The financial NFT service 410 can communicate (flow 10) the received OTP and the request to validate the OTP to the issuer 420. The issuer 420 can return (flow 11) an authorization result to the financial NFT service 410.

If the authorization result indicates that the issuer 420 validates the OTP, the financial NFT service 410 can generate (flow 12) a key-pair and create a financial NFT with the public key. Here, the public key is pushed as part of the financial NFT smart contract and the private key stays within the financial NFT service 410 for future validation.

Once the financial NFT is created, the financial NFT service 410 can then submit (flow 13) a request to the distributed ledger 415 to publish (e.g., mint) the created financial NFT as a distributed ledger transaction. After the financial NFT is minted, the distributed ledger 415 can provide (flow 14) a transaction hash corresponding to the distributed ledger transaction to the financial NFT service 410. The financial NFT service 410 can return (flow 15) the transaction hash to the web3 wallet/PSP web application 405 and the web3 wallet/PSP web application 405 can provide (flow 16) the tokenized financial NFT to the user 400.

Figure 5:
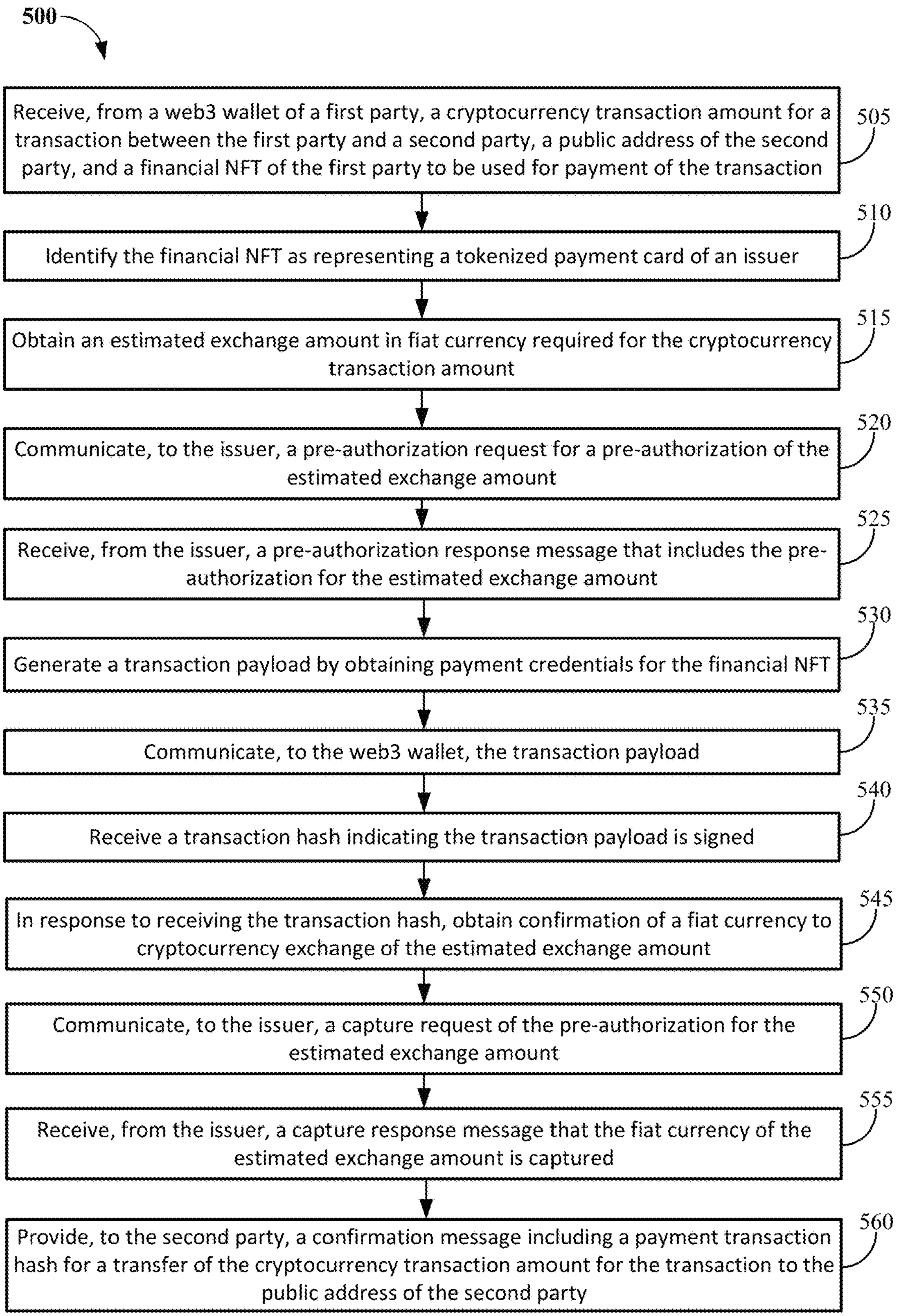
FIG. 5 illustrates an example process flow diagram for payments made with a payment processor supported web3 wallet according to embodiments of the invention.

FIG. 5 illustrates an example process flow diagram for payments made with a payment processor supported web3 wallet according to embodiments of the invention. Referring to FIG. 5, a payment processor (PSP) performing process 500 can be implemented by a server, such as PSP server 240 as shown in FIG. 2, which can be embodied as described with respect to computing system 1700 shown in FIG. 17.

The PSP can receive (505), from a web3 wallet of a first party, a cryptocurrency transaction amount for a transaction between the first party and a second party, a public address of the second party, and a financial card non-fungible token (NFT) of the first party to be used for payment of the transaction. The PSP can identify (510) the financial NFT as representing a tokenized payment card of an issuer.

In some cases, the transaction between the first party and the second party is a web3 transaction or a P2M transaction. For example, the first party can purchase a crypto asset or digital asset from the second party. In this case, the first party is the buyer and the second party is the seller.

In some cases, the transaction between the first party and the second party is a P2P transaction. For example, the first party can send an amount of crypto to the second party. In this case, the first party is the sender and the second party is the receiver.

As previously described, the public address of the second party can be shared publicly to allow others to send digital assets to a web3 wallet of the second party. The financial NFT of the first party is a publicly verifiable and non-transferable NFT that represents a tokenized payment card of the first party.

The PSP can obtain (515) an estimated exchange amount in fiat currency required for the cryptocurrency transaction amount. The estimated exchange amount can include an estimated gas fee, which is in cryptocurrency. The gas fee is a fee required to successfully conduct a transaction on the blockchain. The gas fee can fluctuate and is determined at the time of the transaction. Thus, the estimated gas fee used in the estimated exchange amount may differ from the actual gas fee used when a fiat to crypto exchange is made.

The PSP can obtain (515) the estimated exchange amount by communicating a request for the estimated exchange amount to a cryptocurrency exchange. The request can include the cryptocurrency transaction amount. The PSP can then receive the estimated exchange amount in the fiat currency required for the cryptocurrency transaction amount from the cryptocurrency exchange.

In some cases, the PSP server 615 maintains its own crypto balance and sets its own fiat/crypto conversion rate. In this case, the PSP does not have to communicate with the crypto exchange to obtain the estimated exchange amount. The PSP can maintain the crypto balance to cover the gas fees needed for the fiat to crypto exchanges.

In some cases, the web3 wallet of the first party may contain some amount of crypto, but not enough to cover the crypto transaction amount. In this case, the estimated exchange amount would be the estimated exchange amount in fiat currency required for the portion of cryptocurrency transaction amount not covered by the previously purchased crypto in the web3 wallet of the first party.

Once the PSP obtains the estimated exchange amount, the PSP can perform a two-step payment flow (Authorize-Capture), where payments are first authorized and then they are captured. Authorization is the first step in processing a transaction and ensures the account has sufficient funds and is in good standing by holding funds as pending without charging the card. To perform the authorization, the PSP can issue a pre-authorization request for the desired amount, and, when a pre-authorization is received, the cardholder's available credit limit is reduced by the amount of the pre-authorization until the pre-authorization is captured or expires.

After pre-authorizing the payment, the PSP can perform a capture to complete the transaction. To perform the capture, the PSP can communicate a capture request on the authorization to the issuer. Capturing a payment sends credit card information to the cardholder's bank for processing where the funds are withdrawn from the cardholder's account, processed and transferred to the seller's account. After the funds are captured, the transaction is complete.

The PSP can communicate (520) a pre-authorization request for a pre-authorization of the estimated exchange amount to the issuer. The issuer can be identified in Step 510, where the PSP can identify the financial NFT as representing a tokenized payment card of an issuer. The pre-authorization request can be a (0100) Authorization Message formatted under the ISO 8583 standard. The pre-authorization request asks the issuer to determine if funds in at least the amount of the estimated exchange amount are available for the payment card represented by the financial NFT and get an approval but do not post to account for reconciliation.

In some cases, the PSP can choose to communicate a pre-authorization request for a pre-authorization of the estimated exchange amount to the issuer with a buffer of a percentage (e.g., additional 1%) of the estimated exchange amount. In some cases, the capture amount can only be equal to or less than the pre-authorization amount. Thus, including the buffer as part of the pre-authorization request can cover any differences in the estimated gas fee and the actual gas fee.

The PSP can receive (525) a pre-authorization response message that includes the pre-authorization for the estimated exchange amount from the issuer. The pre-authorization for the estimated exchange amount informs the PSP that funds in the amount of the estimated exchange amount are available for the payment card represented by the financial NFT. The pre-authorization response message can be a (0110) Request Response Message formatted under the ISO 8583 standard.

The PSP can generate (530) a transaction payload by obtaining payment credentials for the financial NFT. The transaction payload is for the transaction between the first party and a second party. A transaction payload refers to the innermost portion of a transaction and contains the data that uniquely identifies the operations applied by the transaction.

The PSP can communicate with a financial NFT service, such as financial NFT service 225 shown on FIG. 2, to generate the transaction payload. The process performed by the financial NFT service is described in flows 14-19 of the sequence diagram described with respect to FIG. 7B.

As previously described, in some cases, the financial NFT service stores a mapping of the financial NFT token identification and payment credentials of the payment card represented by the financial NFT. In this case, the PSP can obtain the payment credentials for the financial NFT from the financial NFT service. In some cases, the PSP stores a mapping of the financial NFT token identification and payment credentials of the payment card. In this case, the PSP can retrieve the payment credentials for the financial NFT.

The PSP can communicate (535) the transaction payload to the web3 wallet of the first party. The PSP can request the first party sign the transaction payload together with financial NFT token information via the web3 wallet.

The PSP can receive (540) a transaction hash indicating the transaction payload is signed. The transaction hash can be used to provide confirmation that the transaction was made and to look up transaction details, such as, but not limited to, sending address, receiving address, amount, date and time, network fees, and confirmations.

Figure 7A:
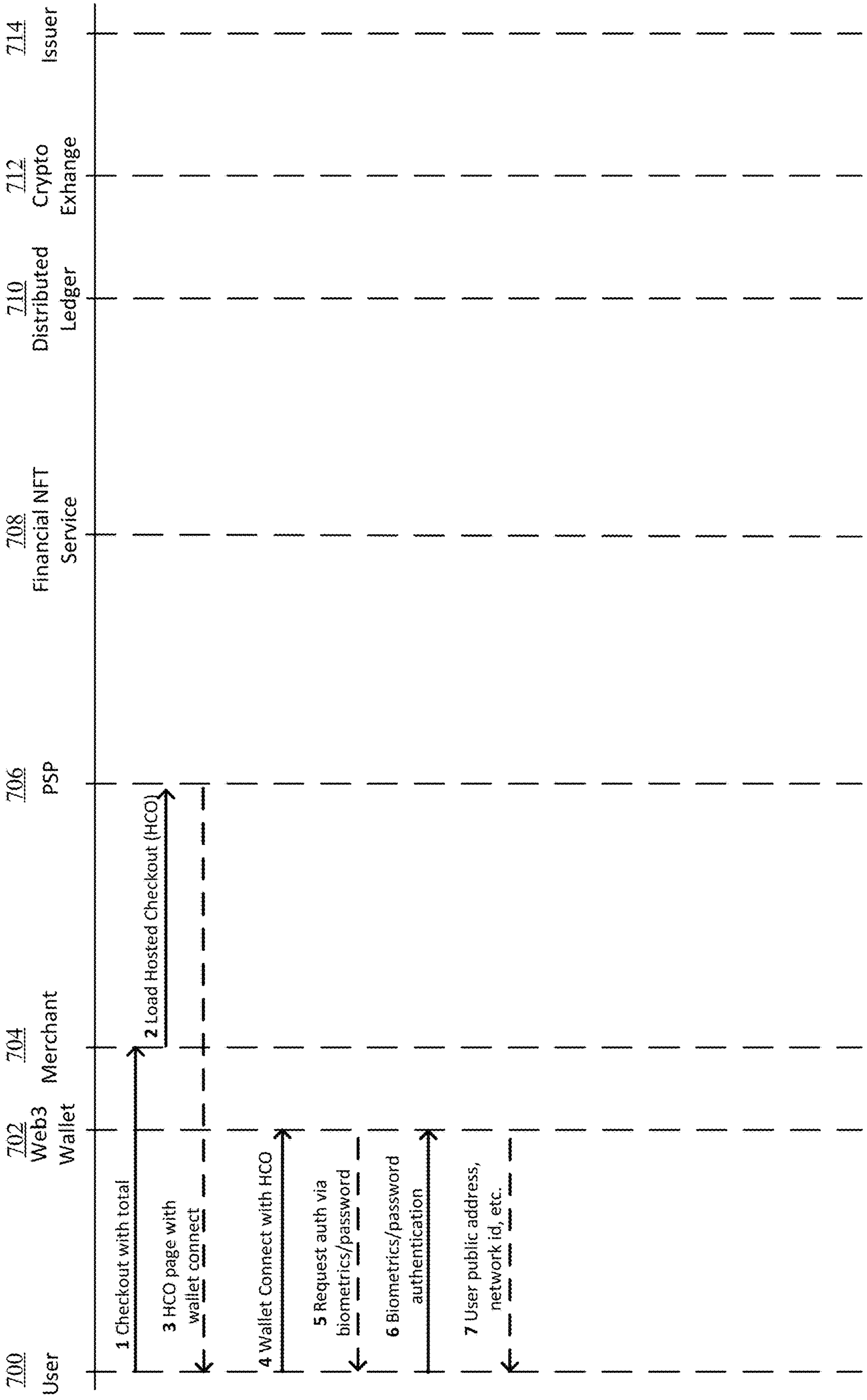
FIGS. 7A-7C illustrate an example sequence diagram for a cryptocurrency payment made with a financial NFT through a hosted checkout according to an embodiment of the invention.
Figure 7B:
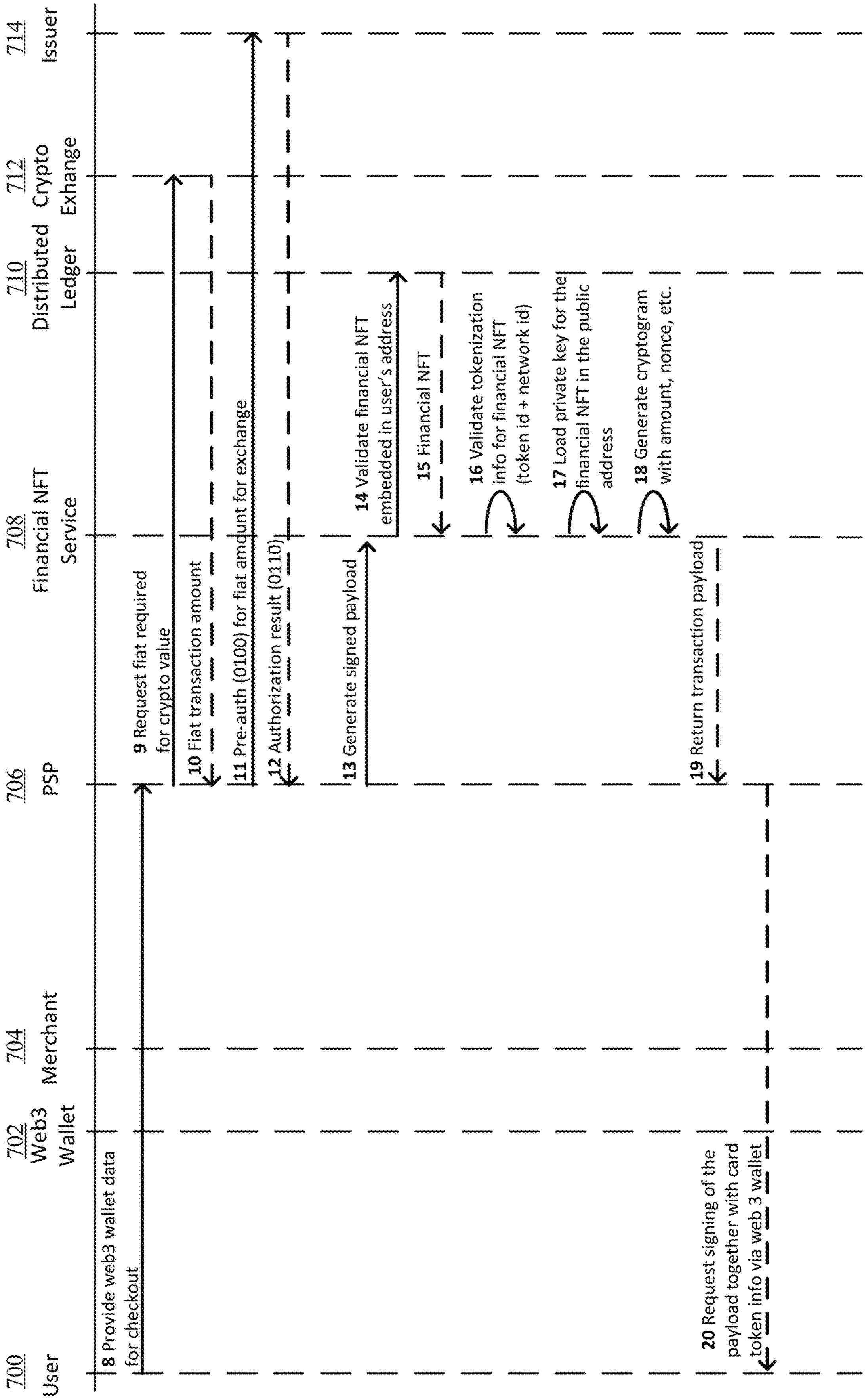
Figure 7C:
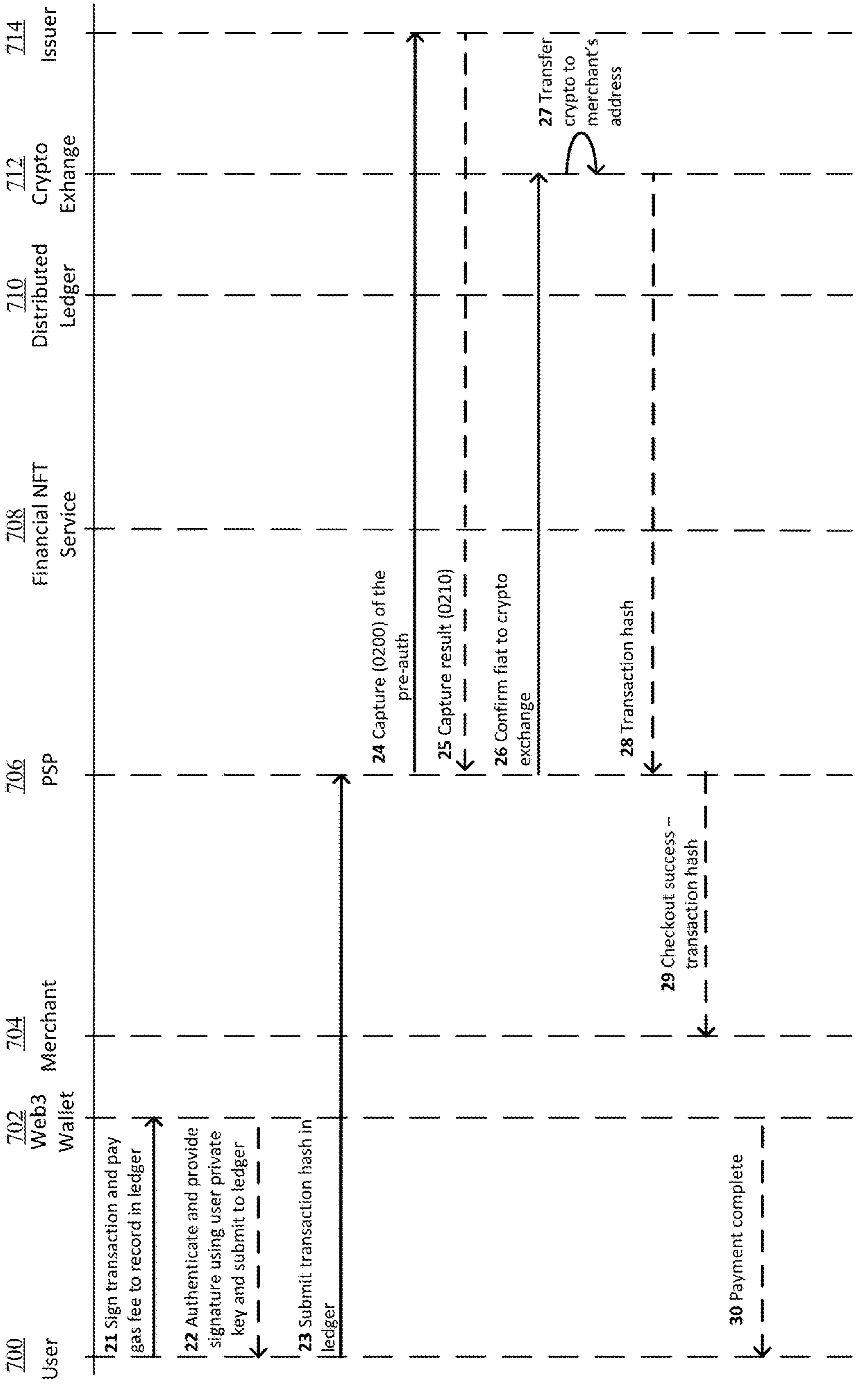

The transaction hash can be received from the first party after the first party signed the transaction payload (as described in flows 21-23 of the sequence diagram described with respect to FIG. 7C). For example, once the web3 transaction has been recorded in the distributed ledger (and the digital asset transferred on the blockchain), the first party can submit the transaction hash for the transaction between the first party and the second party to the PSP.

In response to receiving the transaction hash, the PSP can obtain (545) confirmation of a fiat currency to cryptocurrency exchange of the estimated exchange amount. The confirmation can include an actual exchange amount. The actual exchange amount can include the actual gas fee. The PSP can obtain the confirmation of the fiat currency to cryptocurrency exchange after the cryptocurrency transaction amount is transferred to the public address of the second party.

To obtain the confirmation of the fiat currency to cryptocurrency exchange of the estimated exchange amount, the PSP can communicate a request to perform the fiat currency to cryptocurrency exchange of the estimated exchange amount to the cryptocurrency exchange. The PSP can then receive an exchange transaction hash for the fiat currency to cryptocurrency exchange of the estimated exchange amount from the cryptocurrency exchange.

After the transaction for the fiat currency to cryptocurrency exchange is submitted, the exchange transaction hash is received. Once the transaction fiat currency to cryptocurrency exchange is added to a block, an exchange transaction receipt in which the gas fee is confirmed is received.

The PSP can communicate (550) a capture request of the pre-authorization for the actual exchange amount to the issuer. The capture request can be a (0200) Financial Transaction Request Message formatted under the ISO 8583 standard. The capture request asks the issuer to transfer funds (in the amount of the actual exchange amount with the actual gas fee) out of the account associated with the payment card represented by the financial NFT of the first party.

As previously described, the gas fee can fluctuate and is determined at the time of the transaction; and the estimated gas fee used in the estimated exchange amount may differ from the actual gas fee used when a fiat to crypto exchange is made. Thus, when the exchange transaction receipt in which the gas fee is confirmed is received, the PSP can determine the amount of the capture request. In some cases, the actual gas fee is more than the gas fee used in the estimated exchange amount. In some cases, the actual gas fee is less than the gas fee used in the estimated exchange amount.

In cases where the estimated gas fee is less than the actual gas fee, including the buffer as part of the pre-authorization request can cover the difference in the estimated gas fee and the actual gas fee. In this case, the PSP can charge the exact amount using the actual gas fee during capture.

In some cases, the PSP waits for a "transaction finality," which is the guarantee that a transaction cannot be reversed, changed, or cancelled, before communicating the capture request. For example, it takes about 15 minutes for an Ethereum block to finalize.

The PSP can receive (555) a capture response message that the fiat currency of the actual exchange amount is captured from the issuer. The capture result can be a (0210) Financial Transaction Request Response Message formatted under the ISO 8583 standard. The capture result is the response of the issuer to a financial request (e.g., capture request of Step 545).

The PSP can provide (560) a confirmation message to the second party. The confirmation message can indicate that the transaction between the first party and the second party is complete and can include a payment transaction hash for a transfer of the cryptocurrency transaction amount for the transaction to the public address of the second party.

Figure 6:
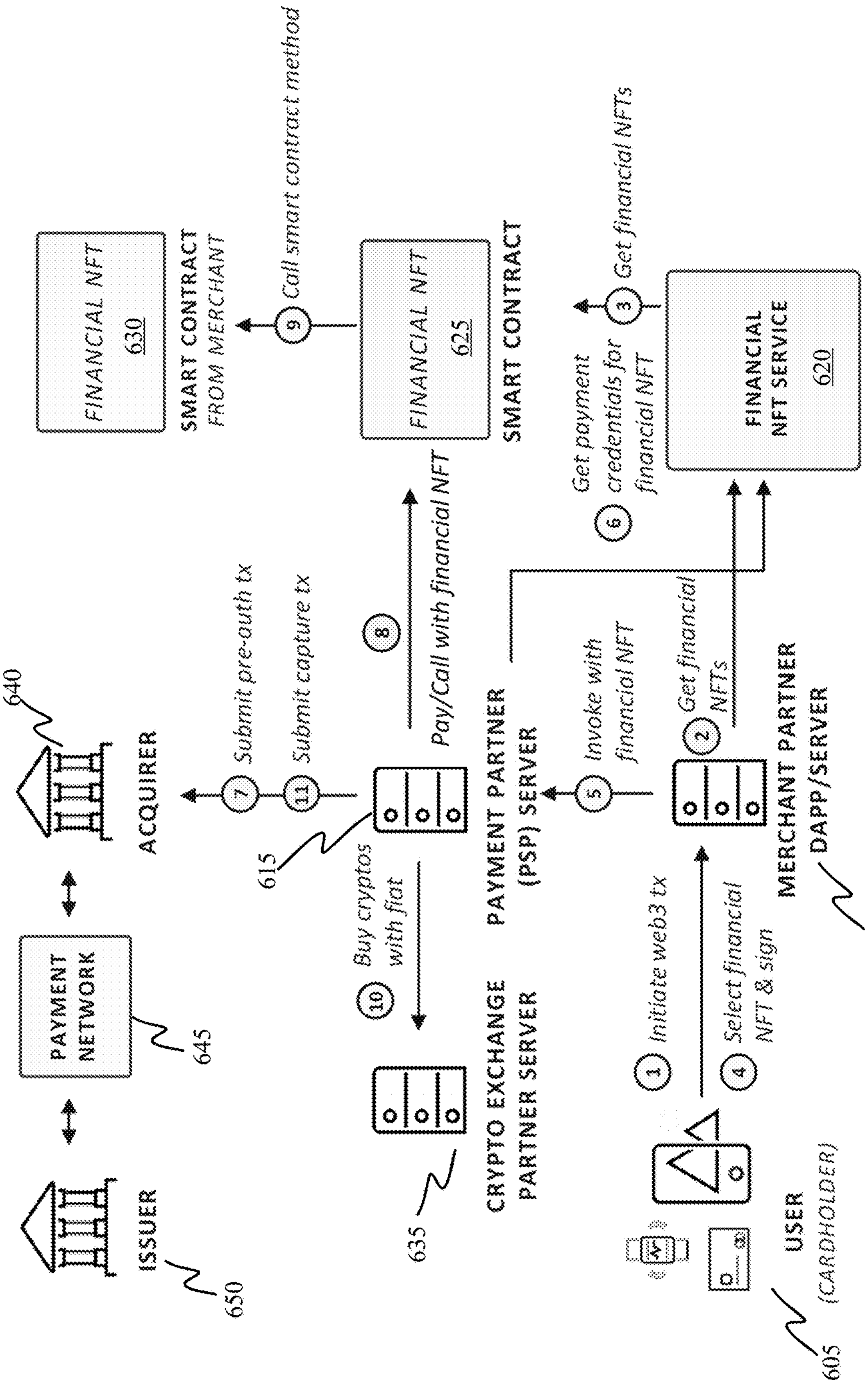
FIG. 6 illustrates an example operating environments and signal flow for financial NFT person-to-merchant (P2M) cryptocurrency payment transaction use case according to embodiments of the invention.

FIG. 6 illustrates an example operating environments and signal flow for financial NFT P2M cryptocurrency payment transaction use case according to embodiments of the invention. Referring to FIG. 6, an example operating environment can include a user 605, a merchant dApp/server 610, a PSP server 615, one or more financial NFT services (e.g., financial NFT service 620), a user financial NFT smart contract 625, a merchant financial NFT smart contract 630, a crypto exchange server 635, an acquirer 640, a payment network 645, and an issuer 650.

The signal flow for the financial NFT P2M cryptocurrency payment transaction use case can be supported when the system knows an address of the merchant financial NFT smart contract 630 and a PSP contract/wallet address. In some cases, the information can be obtained prior to the start of the signal flow. In some cases, the information can be received as part of the signal flow.

To begin the signal flow, the user 605 can initiate a web3 transaction with the merchant dApp/server 610, as shown in Step 1. The web3 transaction can be a purchase of a digital asset by the user 605 from the merchant associated with the merchant dApp/server 610. When the user 605 initiates the web3 transaction, the merchant dApp/server 610 can load a hosted checkout page. The user 605 can connect to their web3 wallet through the hosted checkout page.

The merchant dApp/server 610 can communicate with the financial NFT service 620 to obtain any financial NFTs owned by a public address of the web3 wallet of the user 605, as shown in Step 2. The financial NFT service 620 can communicate with the financial NFT smart contract 630 to provide the available financial NFTs to the merchant dApp/server 610, as shown in Step 3.

Here, if the user 605 has not previously minted any financial NFTs, the user 605 can be redirected to a financial NFT minting flow (e.g., the signal flow for minting a financial NFT described with respect to FIG. 3).

The merchant dApp/server 610 can present the available financial NFTs to the user 605 as payment options for the web3 transaction through the hosted checkout page. The user 605 can select a financial NFT to be used as payment for the web3 transaction and electronically sign the transaction, as shown in Step 4.

The merchant dApp/server 610 can communicate a request for web3 transaction to the PSP server 615, as shown in Step 5. The request can include a crypto transaction amount and the financial NFT. The PSP server 615 can obtain payment credentials for the financial NFT from the financial NFT service 620, as shown in Step 6.

In some cases, the financial NFT service 620 stores a mapping of the financial NFT token identification and payment credentials of the payment card. In some cases, the PSP server 615 stores a mapping of the financial NFT token identification and payment credentials of the payment card represented by the financial NFT. In this case, the PSP server 615 would not have to obtain the payment credentials from the financial NFT service 620.

The PSP server 615 can determine an estimated exchange amount in fiat currency required for the crypto transaction amount. The estimated exchange amount includes an estimated gas fee. The PSP server 615 can then communicate a pre-authorization request for a pre-authorization of the estimated exchange amount to the issuer 650 (via the acquirer 640 and the payment network 645), as shown in Step 7.

Once the PSP server 615 receives a pre-authorization response message that includes the pre-authorization for the estimated exchange amount from the issuer 650 (via the acquirer 640 and the payment network 645), the PSP server 615 can initiate the web3 transaction by submitting the web3 transaction information with the financial NFT to the user financial NFT smart contract 625 (e.g., to be published on a distributed ledger), as shown in Step 8. The PSP server 615 can interact with the user financial NFT smart contract 625 because the PSP server 615 initiates the transaction using the private key of the PSP server 615, thus advantageously allowing for the value added service of crypto acceptance to be provided to a merchant.

In some cases, the payment card represented by the financial NFT can be charged for some or all of the purchase (crypto transaction amount) as well as the gas fee. Here, the PSP server 615 pays both the gas fee and the purchase value in native crypto. In some cases, the payment card represented by the financial NFT can be charged for the gas fee only. Here, the PSP server 615 pays the gas fee in native crypto and the purchase value in ERC-20.

As an example, the web3 wallet of the user 605 may contain some amount of crypto, but not enough to cover the crypto transaction amount. In this case, the PSP server 615 can determine the additional amount of crypto needed for the web3 transaction and the payment card represented by the financial NFT can be charged for a portion of the purchase (crypto transaction amount) as well as the actual gas fee.

As another example, the web3 wallet of the user 605 may contain enough crypto to cover the crypto transaction amount. In this case, the payment card represented by the financial NFT can be charged for only the gas fee.

The user financial NFT smart contract 625 can call the merchant financial NFT smart contract 630, as shown in Step 9. For example, the financial NFT smart contract 625 sends the purchase value (in native crypto) to the merchant financial NFT smart contract 630 allowing for the actual value transfer required for the transaction to be performed.

The merchant financial NFT smart contract 630 can then complete the web3 transaction, meaning that the merchant financial NFT smart contract 630 will receive and deposit the crypto (crypto transaction amount) for the merchant, and then transfer ownership of the digital asset to the user 605.

The PSP server 615 can purchase the necessary cryptos for the crypto transaction amount from the crypto exchange server 635 in fiat currency (estimated exchange amount), as shown in Step 10. Here, the PSP server 615 can perform a fiat to crypto exchange, where the amount of fiat is the estimated exchange amount and the amount of crypto is the amount web3 transaction (crypto transaction amount). Upon performing the fiat to crypto exchange, the PSP can determine the actual exchange amount, including the actual gas fee.

In some cases, the PSP server 615 maintains its own crypto balance and sets its own fiat/crypto conversion rate. In this case, Step 10 is not needed in the transaction flow.

The PSP server 615 can then communicate a capture request of the pre-authorization for the actual exchange amount to the issuer 650 (via the acquirer 640 and the payment network 645), as shown in Step 11. The capture request is used to request a transfer of funds (in the amount of the actual exchange amount) out of the account associated with the payment card represented by the financial NFT of the user 605.

FIGS. 7A-7C illustrate an example sequence diagram for a cryptocurrency payment made with a financial NFT through a hosted checkout according to an embodiment of the invention. Hosted checkout allows a merchant to collect payment details from a consumer through an interaction hosted and displayed by a payment gateway. Advantageously, through hosted checkout, the merchant does not have to see or handle payment details directly because payment details are collected by the hosted payment interface and submitted directly from the consumer's browser to the payment gateway.

Referring to FIGS. 7A-7C, the example sequence diagram can include a user 700, a web3 wallet 702, a merchant 704, a PSP 706, one or more financial NFT services (e.g., financial NFT service 708), a distributed ledger 710, a crypto exchange 712, and an issuer 714. In some cases, the merchant 704 is a merchant dApp/server having hosted checkout.

Referring to FIG. 7A, to begin the sequence flow, the user 700 initiates (flow 1) the payment process for a web3 transaction at the merchant 704. Examples of the web3 transaction include, but are not limited to, a purchase of an NFT, cryptocurrency, or other digital asset or crypto asset.

In response, the merchant 704 communicates with the PSP 706 to load (flow 2) the hosted checkout and display a chosen payment interface (HCO page). The PSP 706 provides (flow 3) the HCO page with wallet connect to the user 700.

The user 700 can request (flow 4) to connect the web3 wallet 702 via the wallet connect standard connect through the hosted checkout page. The web3 wallet 702 can request (flow 5) authentication to connect via biometrics or a password and the user 700 can provide (flow 6) biometrics or password authentication to the web3 wallet 702. The web3 wallet 702 can provide (flow 7) information such as, but not limited to, a user public address and a network identifier to the user 700.

Referring to FIG. 7B, the user 700 can provide (flow 8) web3 wallet data for checkout to the PSP 706. The web3 wallet data can include a crypto transaction amount and the financial NFT.

The PSP 706 can request (flow 9) an estimated exchange amount in fiat currency required for the crypto transaction amount from the crypto exchange 712; and the crypto exchange 712 can provide (flow 10) the estimated exchange amount in fiat currency to the PSP 706. As previously described, in some cases, the PSP 706 maintains a crypto balance and does not have to communicate with the crypto exchange 712 to obtain the estimated exchange amount.

The PSP 706 can then communicate (flow 11) a pre-authorization request for a pre-authorization of the estimated exchange amount to the issuer 714. The pre-authorization request can be a (0100) Authorization Message formatted under the ISO 8583 standard and includes an estimated gas fee. The pre-authorization request asks the issuer 714 to determine if funds are available for the payment card represented by the financial NFT and get an approval but do not post to account for reconciliation. The issuer 714 can then communicate (flow 12) a pre-authorization response message to the PSP 706. The pre-authorization response message can be a (0110) Request Response Message formatted under the ISO 8583 standard.

Once the PSP 706 receives a pre-authorization response message that includes the pre-authorization for the estimated exchange amount from the issuer 714, the PSP 706 can communicate (flow 13) a request to generate a signed payload for the web3 transaction to the financial NFT service 708.

The financial NFT service 708 can communicate with the distributed ledger 710 to validate (flow 14) the financial NFT embedded in the web3 wallet address of the user 700. Once validated, the distributed ledger 710 can provide (flow 15) the financial NFT service 708 the financial NFT.

The financial NFT service 708 can validate (flow 16) tokenization information for the financial NFT, including the token identifier and the network identifier. Once the tokenization information is validated, the financial NFT service 708 can load (flow 17) the private key for the financial NFT in the public address and generate (flow 18) a cryptogram with information such as, but not limited to, amount and nonce.

The financial NFT service 708 can return (flow 19) the transaction payload to the PSP 706 and the PSP can communicate (flow 20) a request to sign the transaction payload for the web3 transaction together with the payment card token information to the user 700 via the web3 wallet 702.

Referring to FIG. 7C, through the web3 wallet 702, the user 700 can sign (flow 21) the transaction payload for the web3 transaction provided to the user 700 in flow 20 described with respect to FIG. 7B. The user 700 can also pay the gas fee for the web3 transaction in order to record the web3 transaction in the distributed ledger 710. The web3 wallet 702 can authenticate (flow 22) and provide a signature using the private key of the user 700 and submit the web3 transaction to the distributed ledger 710.

Once the web3 transaction has been recorded in the distributed ledger 710, the user 700 can submit (flow 23) a transaction hash in the distributed ledger 710 for the web3 transaction to the PSP 706. It should be noted that the sequence diagram illustrated in FIGS. 7A-7C does not show the transfer of the digital asset purchased in the web3 transaction on the blockchain.

The PSP 706 can then communicate (flow 24) a capture request of the pre-authorization for the actual exchange amount to the issuer 714. The capture request can be a (0200) Financial Transaction Request Message formatted under the ISO 8583 standard. The capture request asks the issuer 714 to transfer funds (in the amount of the actual exchange amount including the actual gas fee) out of the account associated with the payment card represented by the financial NFT of the user 605.

The issuer 714 can then communicate (flow 25) a capture result to the PSP 706. The capture result can be a (0210) Financial Transaction Request Response Message formatted under the ISO 8583 standard. The capture result is the response of the issuer 714 to a financial request (e.g., capture request of flow 24).

The PSP 706 can communicate with the crypto exchange 712 to confirm (flow 26) a fiat to crypto exchange of the estimated exchange amount. The crypto exchange 712 can transfer (flow 27) crypto to the account of the merchant 704. The amount of crypto transferred to the account of the merchant 704 is the crypto transaction amount.

Once the crypto has been transferred, the crypto exchange 712 can provide (flow 28) a transaction hash to the PSP 706 for the fiat to crypto exchange. The PSP 706 can provide (flow 29) the merchant 704 confirmation that the checkout was a success, as well as the transaction hash for the fiat to crypto exchange. The web3 wallet 702 can notify (flow 30) the user 700 that the payment has been completed.

Figure 8:
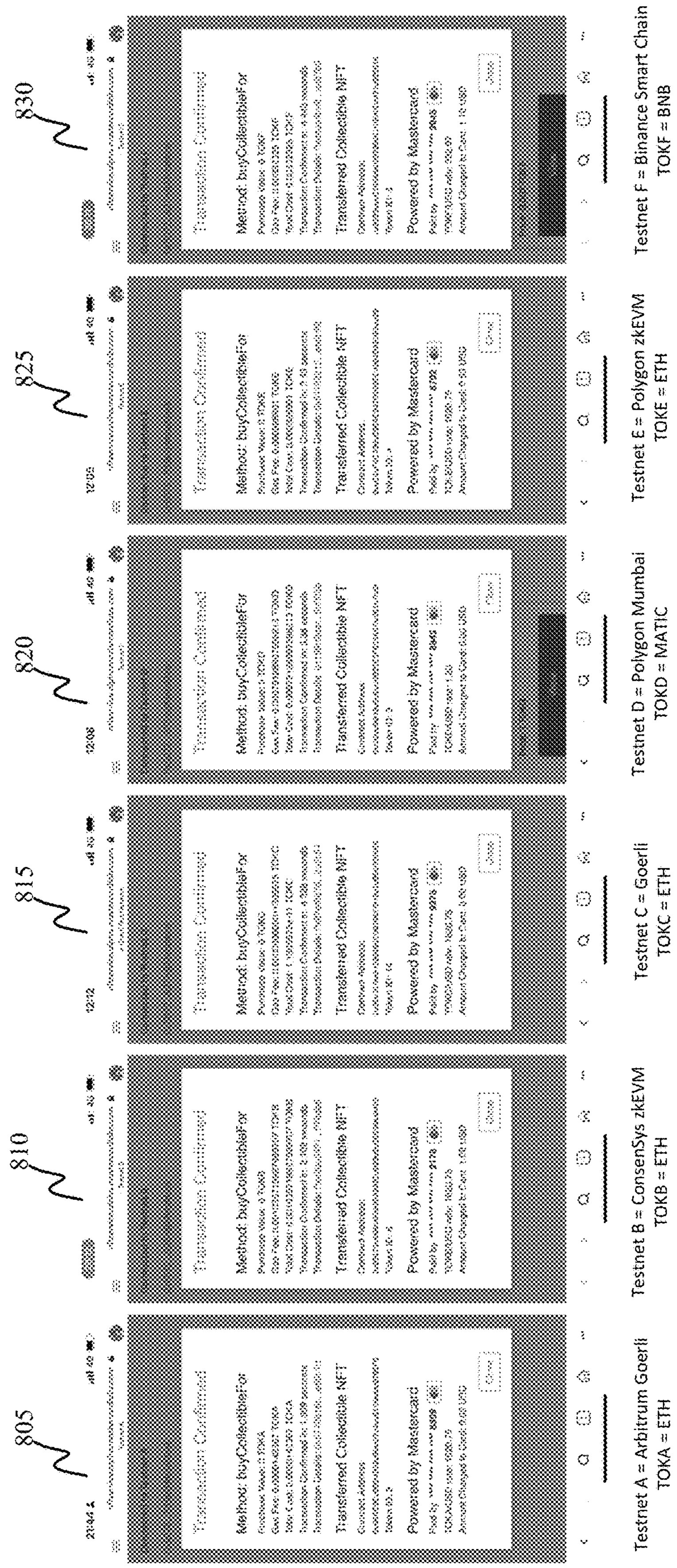
FIG. 8 illustrates example transaction results of a cryptocurrency payment made with a financial NFT on different blockchains according to an embodiment of the invention.

FIG. 8 illustrates example transaction results of a cryptocurrency payment made with a financial NFT on different blockchains according to an embodiment of the invention. Referring to FIG. 8, transaction results (result 805, result 810, result 815, result 820, result 825, and result 830) for sample cryptocurrency payments for a collectible NFT made with a financial NFT on different blockchains are shown. A variety of different testnet blockchains and testnet coins were used for each transaction result. A testnet is an alternative blockchain to be used for testing and testnet coins are a special type of cryptocurrency used for testing purposes.

In the illustrative example, for result 805, the testnet used was "Testnet A=Arbitrum Goerli" and the testnet coin used was "TOKA= ETH"; for result 810, the testnet used was "Testnet B= ConsenSys zkEVM" and the testnet coin used was "TOKB= ETH"; for result 815, the testnet used was "Testnet C= Goerli" and the testnet coin used was "TOKC= ETH"; for result 820, the testnet used was "Testnet D= Polygon Mumbai" and the testnet coin used was "TOKD= MATIC"; for result 825, the testnet used was "Testnet E= Polygon zkEVM" and the testnet coin used was "TOKE= ETH"; and for result 830, the testnet used was "Testnet F= Binance Smart Chain" and the testnet coin used was "TOKF= BNB".

Each collectible NFT had the same purchase value (0.0 tokens). The token/USD exchange rate for ETH was 1620.75; the token/USD exchange rate for MATIC was 1.2; and the token/USD exchange rate for BNB was 332.07.

In the illustrative example, result 805, result 810, result 815, and result 825 used the same token (ETH), but completed the transaction at a different time. Even though both the purchase value (0.0 tokens) and the exchange rate (1620.75) were the same, each result (result 805, result 810, result 815, and result 825) had a different amount charged.

The difference in the amount charged is due to the actual gas fee charged for each transaction. Here, the actual gas fee for each transaction result was different. As previously described, the gas fee is a fee required to successfully conduct a transaction on the blockchain. The gas fee can fluctuate and is determined at the time of the transaction. Thus, since each transaction was completed at a different time and the gas fee fluctuated, the amount charged to the payment card in each transaction result is different.

In the illustrative example, result 805, result 810, result 815, and result 825 used the same token (ETH); and even though both the purchase value (0.0 tokens) and the exchange rate (1620.75) were the same, each result had a different amount charged. The amount charged for result 805 was 0.02 USD, the amount charged for result 810 was 1.68 USD, the amount charged for result 815 was 0.00 USD, and the amount charged for result 825 was 0.53 USD.

The difference in the amount charged is due to the gas fee. As previously described, the gas fee is a fee required to successfully conduct a transaction on the blockchain. The gas fee can fluctuate and is determined at the time of the transaction. There, since each transaction was completed at a different time (and thus had a different gas fee), the amount charged to the payment card in each transaction result is different.

Figure 9:
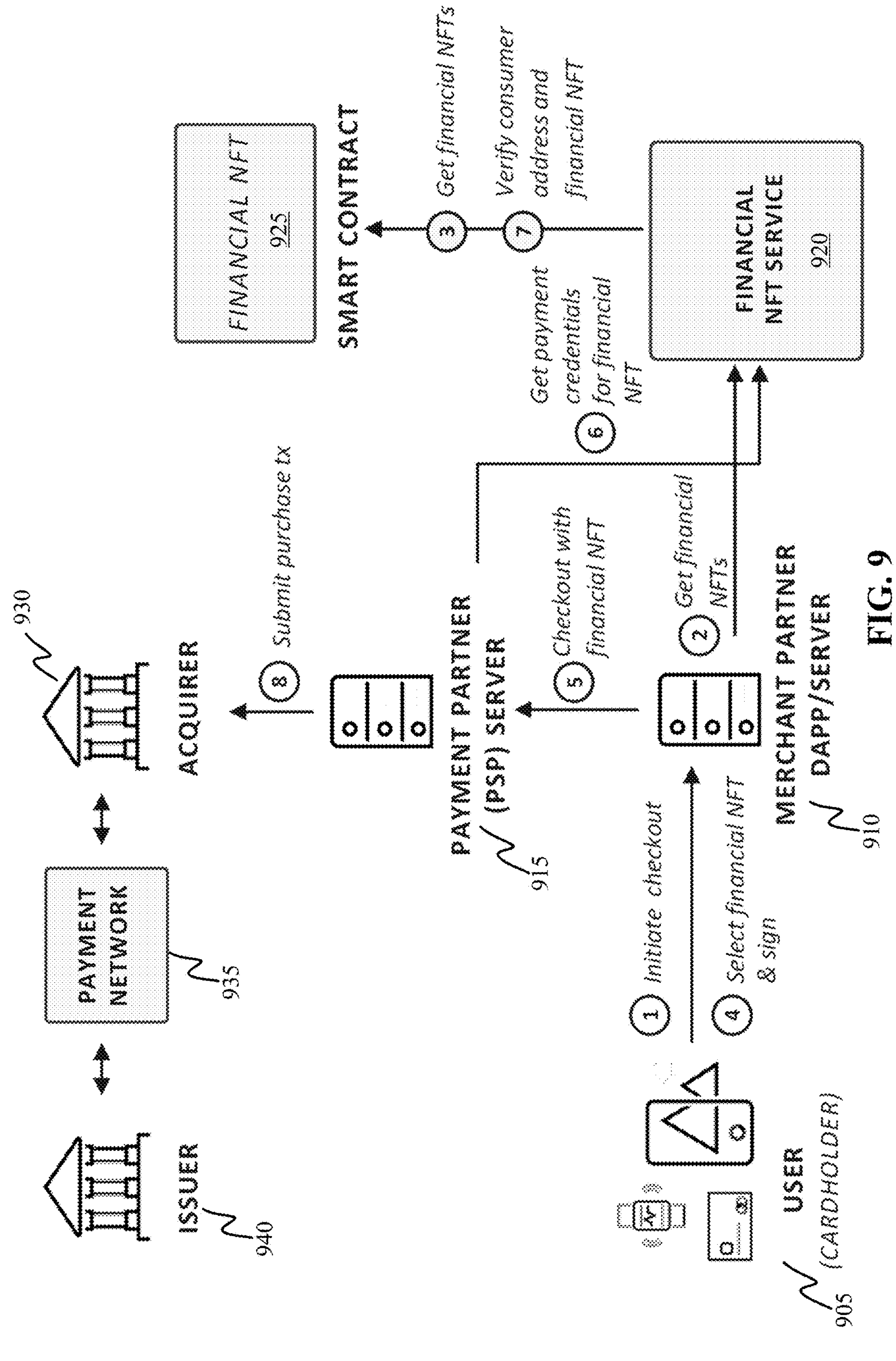
FIG. 9 illustrates an example operating environments and signal flow for a financial NFT P2M fiat payment transaction use case according to embodiments of the invention.

FIG. 9 illustrates an example operating environments and signal flow for a financial NFT P2M fiat payment transaction use case according to embodiments of the invention. As an example of a financial NFT P2M fiat payment transaction use case, a user may purchase an in-game item, such as an avatar, within the metaverse from a merchant only accepting fiat.

Referring to FIG. 9, an example operating environment can include a user 905, a merchant dApp/server 910, a PSP server 915, one or more financial NFT services (e.g., financial NFT service 920), a financial NFT smart contract 925, an acquirer 930, a payment network 935, and an issuer 940.

To begin the signal flow for the financial NFT P2M fiat payment transaction use case, the user can 905 initiate a checkout at the merchant dApp/server 910 using, for example their web3 wallet, as shown in Step 1. Here, the public address of the web3 wallet is received by the merchant dApp/server 910. The merchant dApp/server 910 can communicate with the financial NFT service 920 to determine if the user 905 has any financial NFTs on the public address of the web3 wallet, as shown in Step 2. The financial NFT service 920 can communicate with the financial NFT smart contract 925 to provide the financial NFTs to the merchant dApp/server 910, as shown in Step 3.

Here, if the user 905 has not previously minted any financial NFTs, the user 905 can be redirected to a financial NFT minting flow (e.g., the signal flow for minting a financial NFT described with respect to FIG. 3).

The merchant dApp/server 910 can present the available financial NFTs to the user 905 as payment options for the purchase. The user 905 can select a financial NFT to be used for payment of the transaction and electronically sign the transaction, as shown in Step 4.

The PSP server 915 can receive a request to checkout with the selected financial NFT from the merchant dApp/server 910, as shown in Step 5. The request can include a transaction amount and the financial NFT. The PSP server 915 can obtain payment credentials for the financial NFT from the financial NFT service 920, as shown in Step 6. The financial NFT service 920 can verify the user address of the user 905 and the financial NFT with the financial NFT smart contract 925, as shown in Step 7.

Once the verification of the user address of the user 905 and the financial NFT is complete, the PSP server 915 can submit a purchase transaction request to the issuer 940 of the payment card represented by the financial NFT (via the acquirer 930 and the payment network 935).

Figure 10:
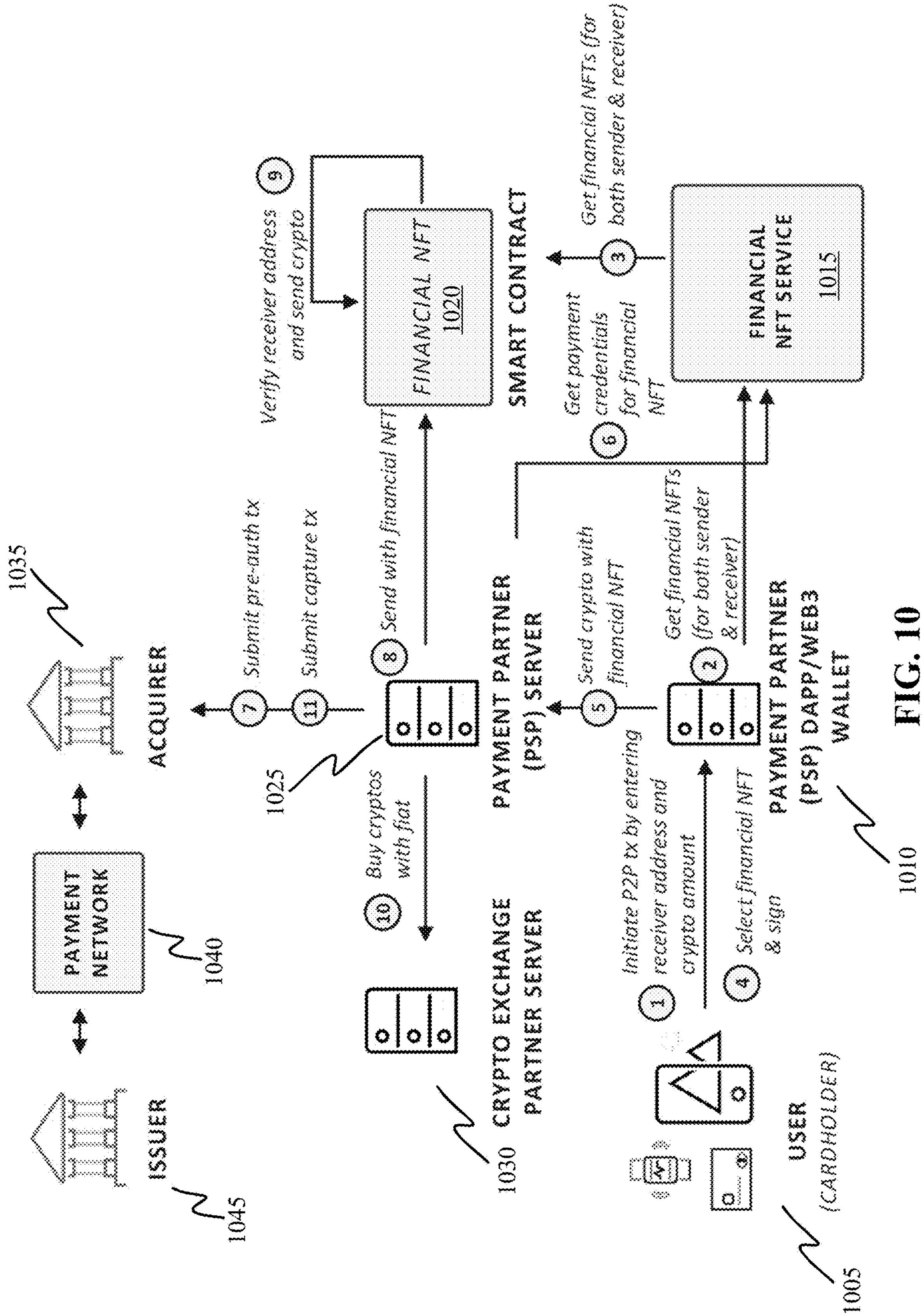
FIG. 10 illustrates an example operating environments and signal flow for a financial NFT person-to-person (P2P) cryptocurrency payment transaction use case according to embodiments of the invention.

FIG. 10 illustrates an example operating environments and signal flow for a financial NFT P2P cryptocurrency payment transaction use case according to embodiments of the invention. Referring to FIG. 10, an example operating environment can include a user 1005, a web3 wallet/PSP dApp 1010, one or more financial NFT services (e.g., financial NFT service 1015), a financial NFT smart contract 1020, PSP server 1025, a crypto exchange server 1030, an acquirer 1035, a payment network 1040, and an issuer 1045.

This signal flow can be supported when the system knows a smart contract/wallet address of web3 wallet/PSP dApp 1010. In some cases, the information can be obtained prior to the start of the signal flow. In some cases, the information can be received as part of the signal flow.

To begin the signal flow for the financial NFT P2P cryptocurrency payment transaction use case, the user (e.g., sender) 1005 can initiate a P2P transaction with a receiver (not shown) at the web3 wallet/PSP dApp 1010, as shown in Step 1. The user 1005 can initiate the P2P transaction by entering a receiver address and a cryptocurrency amount for the P2P transaction.

The web3 wallet/PSP dApp 1010 can communicate with the financial NFT service 1015 to determine if the user 1005 has any financial NFTs on a public address of the web3 wallet and if the receiver has any financial NFTs on the receiver address, as shown in Step 2. The financial NFT service 1015 can communicate with the financial NFT smart contract 1020 to provide the financial NFTs to the web3 wallet/PSP dApp 1010, as shown in Step 3.

Here, if the user 1005 has not previously minted any financial NFTs, the user 1005 can be redirected to a financial NFT minting flow (e.g., the signal flow for minting a financial NFT described with respect to FIG. 3).

Additionally, if after Step 3, the receiver's account doesn't own any financial NFT, web3 wallet/PSP dApp 1010 shows error message to user 1005 and signal flow stops.

The web3 wallet/PSP dApp 1010 can present the available financial NFTs to the user 1005 as payment options for the P2P payment. The user 1005 can select a financial NFT to be used for the P2P payment and electronically sign the transaction, as shown in Step 4.

The PSP server 1025 can receive a request to make a P2P payment with the selected financial NFT from the web3 wallet/PSP dApp 1010, as shown in Step 5. The request can include a crypto transaction amount and the financial NFT. The PSP server 1025 can obtain payment credentials for the financial NFT from the financial NFT service 1015, as shown in Step 6.

In some cases, the financial NFT service 1015 stores a mapping of the financial NFT token identification and payment credentials of the payment card. In some cases, the PSP server 1025 stores a mapping of the financial NFT token identification and payment credentials of the payment card.

In this case, the PSP server 1025 would not have obtain the payment credentials from the financial NFT service 1015.

The PSP server 1025 can determine an estimated exchange amount in fiat currency required for the amount of the P2P payment. The estimated exchange amount includes an estimated gas fee. The PSP server 1025 can then communicate a pre-authorization request for a pre-authorization of the estimated exchange amount to the issuer 1045 (via the acquirer 1035 and the payment network 1040), as shown in Step 7.

Once the PSP server 1025 receives a pre-authorization response message that includes the pre-authorization for the estimated exchange amount from the issuer 1045 (via the acquirer 1035 and the payment network 1040), the PSP server 1025 can submit the P2P payment transaction with the financial NFT to the financial NFT smart contract 1020 (e.g., to be published on a distributed ledger), as shown in Step 8. Here, financial NFT smart contract 1020 can verify the receiver address and send the crypto to the receiver address, as shown in Step 9. In some cases, the receiver address is verified by checking whether the receiver account owns one or more financial NFTs. If the receiver address is not verified, the P2P payment transaction reverts.

The PSP server 1025 can purchase cryptos in the amount of the P2P payment from the crypto exchange server 1030 in fiat currency (estimated exchange amount), as shown in Step 10. Here, the PSP server 1025 can perform a fiat to crypto exchange, where the amount of fiat is the estimated exchange amount and the amount of crypto is the amount of the P2P payment. Upon purchasing the cryptos, the PSP can obtain an actual exchange amount including the actual gas fee for the purchase.

In some cases, the PSP server 1025 maintains its own crypto balance and sets its own fiat/crypto conversion rate. In this case, Step 10 is not needed in transaction flow.

The PSP server 1025 can then communicate a capture request of the pre-authorization for the actual exchange amount to the issuer 1045 (via the acquirer 1035 and the payment network 1040), as shown in Step 11.

Figure 11:
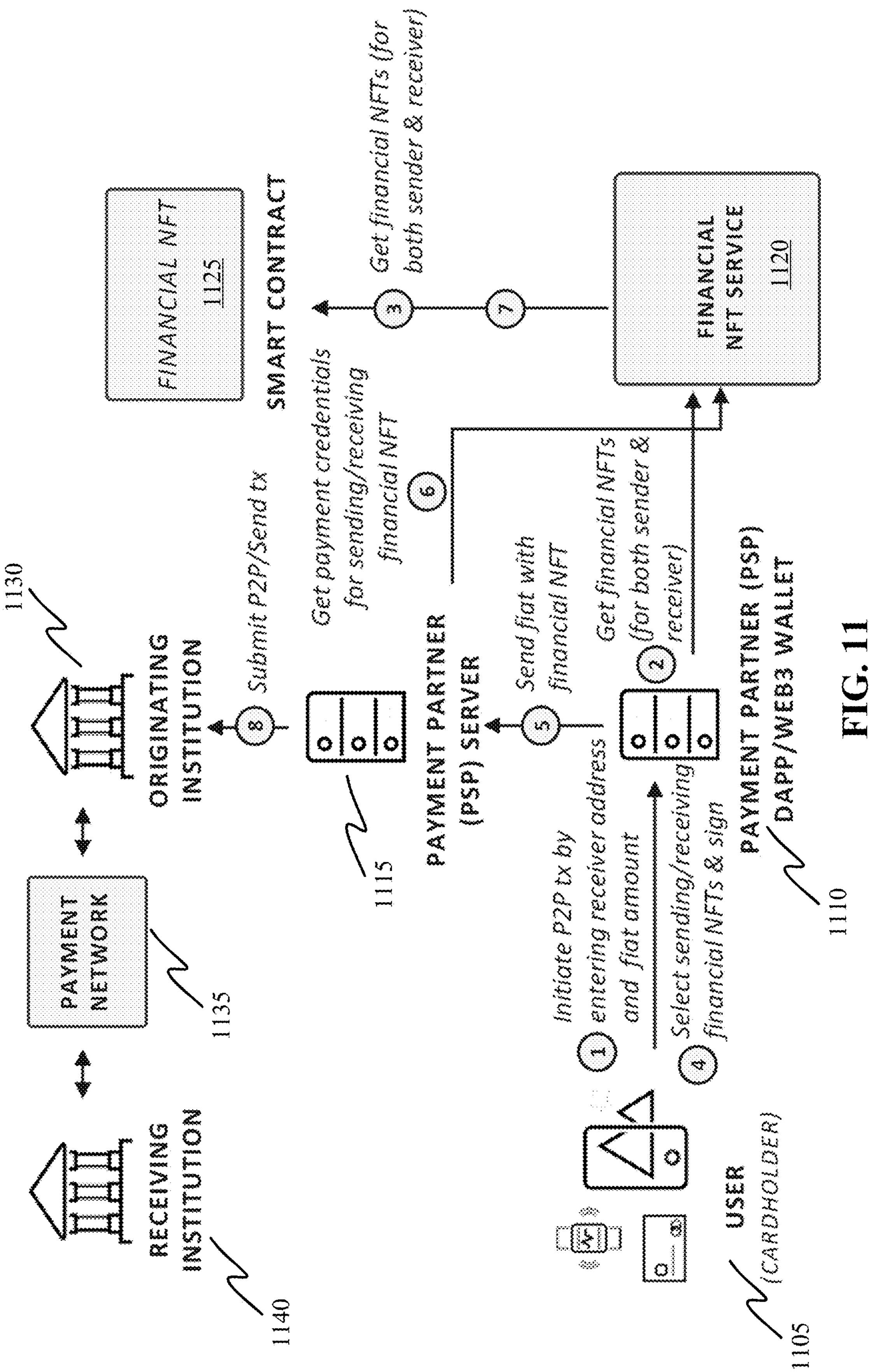
FIG. 11 illustrates an example operating environments and signal flow for a financial NFT P2P fiat payment transaction use case according to embodiments of the invention.

FIG. 11 illustrates an example operating environments and signal flow for a financial NFT P2P fiat payment transaction use case according to embodiments of the invention. Referring to FIG. 11, an example operating environment can include a user 1105, a web3 wallet/PSP dApp 1110, a PSP server 1115, one or more financial NFT services (e.g., financial NFT service 1120), a financial NFT smart contract 1125, an originating institution 1130, a payment network 1135, and a receiving institution 1140.

This signal flow can be supported when the system knows a smart contract/wallet address of web3 wallet/PSP dApp 1110. In some cases, the information can be obtained prior to the start of the signal flow. In some cases, the information can be received as part of the signal flow.

To begin the signal flow for the financial NFT P2P fiat payment transaction use case, the user (e.g., sender) 1105 can initiate a P2P payment transaction with a receiver (not shown) at the web3 wallet/PSP dApp 1110, as shown in Step 1. The user 1105 can initiate the P2P transaction by entering a receiver address and a fiat amount for the P2P payment transaction.

The web3 wallet/PSP dApp 1110 can communicate with the financial NFT service 1120 to determine if the user 1105 has any financial NFTs on a public address of the web3 wallet and if the receiver has any financial NFTs on the receiver address, as shown in Step 2. The financial NFT service 1120 can communicate with the financial NFT smart contract 1125 to provide the financial NFTs to the web3 wallet/PSP dApp 1110, as shown in Step 3.

Here, if the user 1105 has not previously minted any financial NFTs, the user 1105 can be redirected to a financial NFT minting flow (e.g., the signal flow for minting a financial NFT described with respect to FIG. 3).

Additionally, if after Step 3, the receiver's account doesn't own any financial NFT, web3 wallet/PSP dApp 1110 shows error message to the user 1105 and signal flow stops.

The web3 wallet/PSP dApp 1110 can present the available financial NFTs to the user 1105 as payment options for the P2P payment. The user 1105 can select a financial NFT to be used for the P2P payment and electronically sign the transaction, as shown in Step 4.

The PSP server 1115 can receive a request to make a P2P payment with the selected financial NFT from the web3 wallet/PSP dApp 1110, as shown in Step 5. The request can include a fiat transaction amount and the financial NFT. The PSP server 1115 can obtain payment credentials for the financial NFT of the user 1105 and the financial NFT of the receiver from the financial NFT service 1120, as shown in Step 6.

The financial NFT service 1120 communicates with the financial NFT smart contract 1125 to verify the receiver address, receiver financial NFT, address of the user 1105, and financial NFT of the user 1105, as shown in Step 7.

Once the verification of the receiver address, receiver financial NFT, address of the user 1105, and financial NFT of the user 1105 is complete, the PSP server 1115 can submit a P2P send transaction request to the receiving institution 1140 of the payment card represented by the financial NFT of the receiver (via the originating institution 1130 and the payment network 1135), as shown in Step 8.

Figure 12:
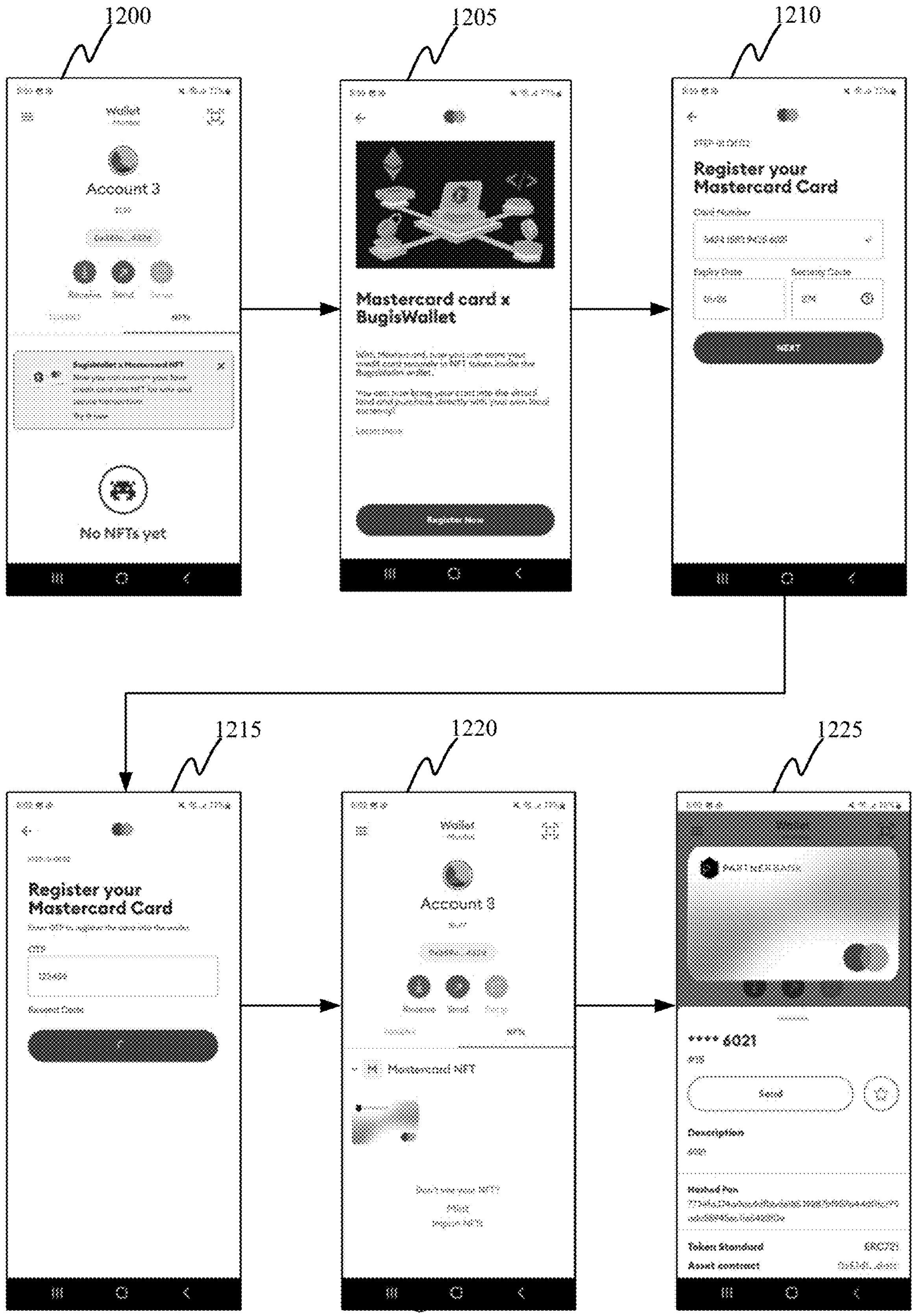
FIG. 12 illustrates graphical user interface snapshots of an example scenario of minting a financial NFT.

FIG. 12 illustrates graphical user interface snapshots of an example scenario of minting a financial NFT. Referring to FIG. 12, a user (Account 3) can add a payment card to a web3 wallet through the minting of a financial NFT. The minting can be performed, for example, using the signal flow for minting a financial NFT described with respect to FIG. 3

When the user opens their web3 wallet, the user's current digital assets are displayed, which in this case are none, as shown in snapshot 1200. The user chooses to register a payment card to add a payment card to their web3 wallet, as shown in snapshot 1205. The user then adds payment card details (e.g., credit card, debit card, etc.) of the desired payment card, as shown in snapshot 1210.

The user is asked to enter an OTP to register the payment card into the web3 wallet, as shown in snapshot 1215. Once the payment card is successfully minted, the financial NFT representing the tokenized payment card is added and displayed in the user's web3 wallet, as shown in snapshot 1220. The user can then use the newly minted financial NFT representing the tokenized payment card to make a transaction, as shown in snapshot 1225.

Figure 13:
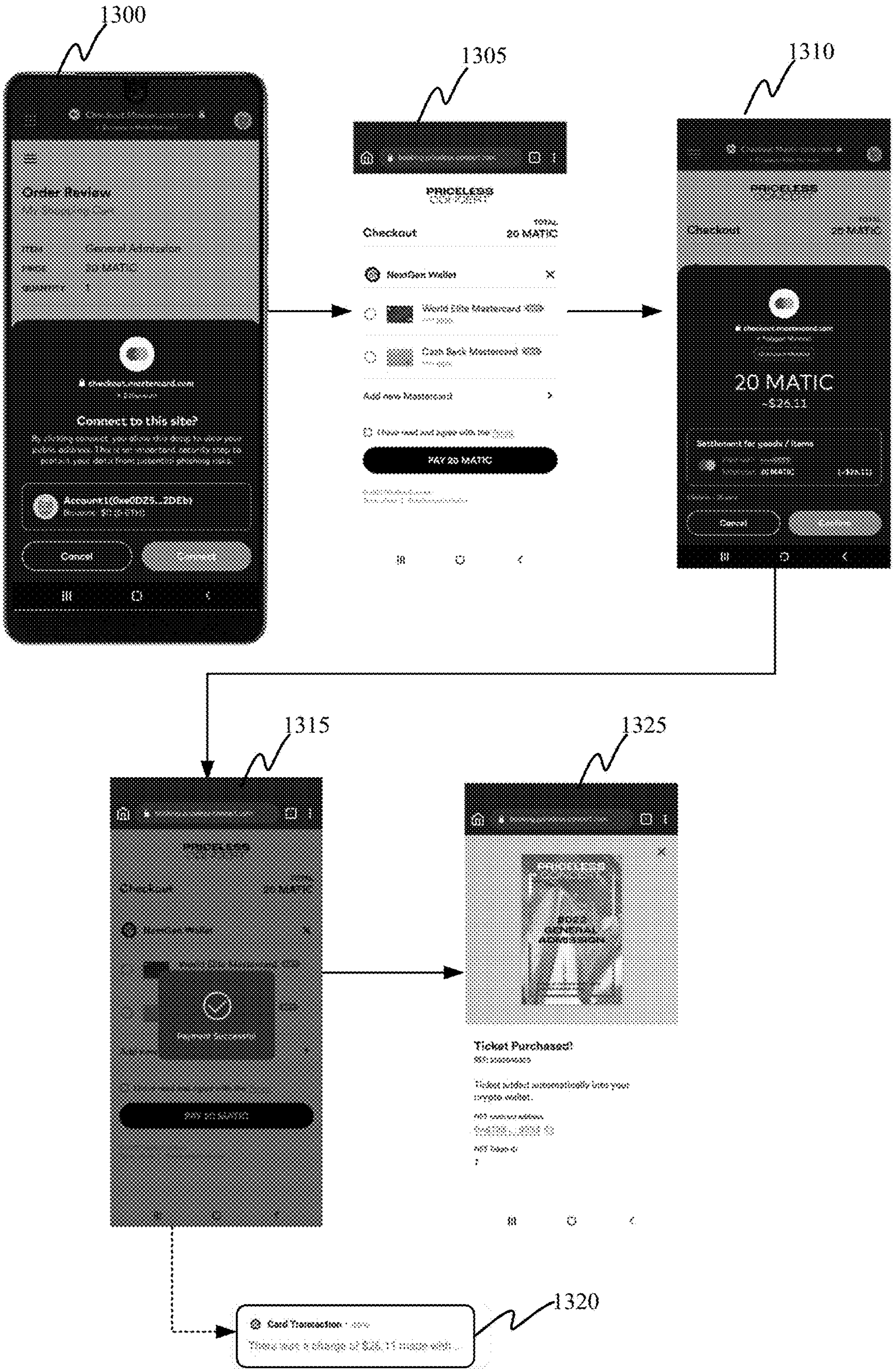
FIG. 13 illustrates graphical user interface snapshots of an example scenario of purchasing a concert ticket using a financial NFT.

FIG. 13 illustrates graphical user interface snapshots of an example scenario of purchasing a concert ticket using a financial NFT. Referring to FIG. 13, in the example scenario, a user wants to purchase a concert ticket worth 20 Matic digital currency at a merchant which has an integrated PSP hosted checkout in its web3 store.

During the checkout process, the user can connect their web3 wallet via the wallet connect standard, as shown in snapshot 1300. The PSP can then retrieve and list any financial NFTs owned by the user, as shown in snapshot 1305.

The user can then select a financial NFT and make the payment for the concert tickets. When the user selects the desired financial NFT, an estimated exchange amount in fiat currency ($26.11) required for the crypto transaction amount (20 Matic) can be displayed and the user is asked to confirm the transaction, as shown in snapshot 1310. The estimated exchange amount includes an estimated gas fee for the transaction. The conversion of $26.11 to 20 Matic is done automatically by the PSP and crypto exchange partner or issuer; and the merchant receives 20 Matic digital currency tokens or preferred currency in real time.

The user can then receive confirmation that the payment was successful, as shown in snapshot 1315. Here, the actual exchange amount is shown including the actual gas fee. Since, the gas fee can fluctuate and the actual gas fee is determined at the time of the transaction, estimated exchange amount and the actual exchange amount is different. In some cases, the user can also receive a notification (e.g., notification 1320) of the payment card transaction. The concert ticket is then transferred to the user and added to the user's web3 wallet, as shown in snapshot 1325.

Figure 14:
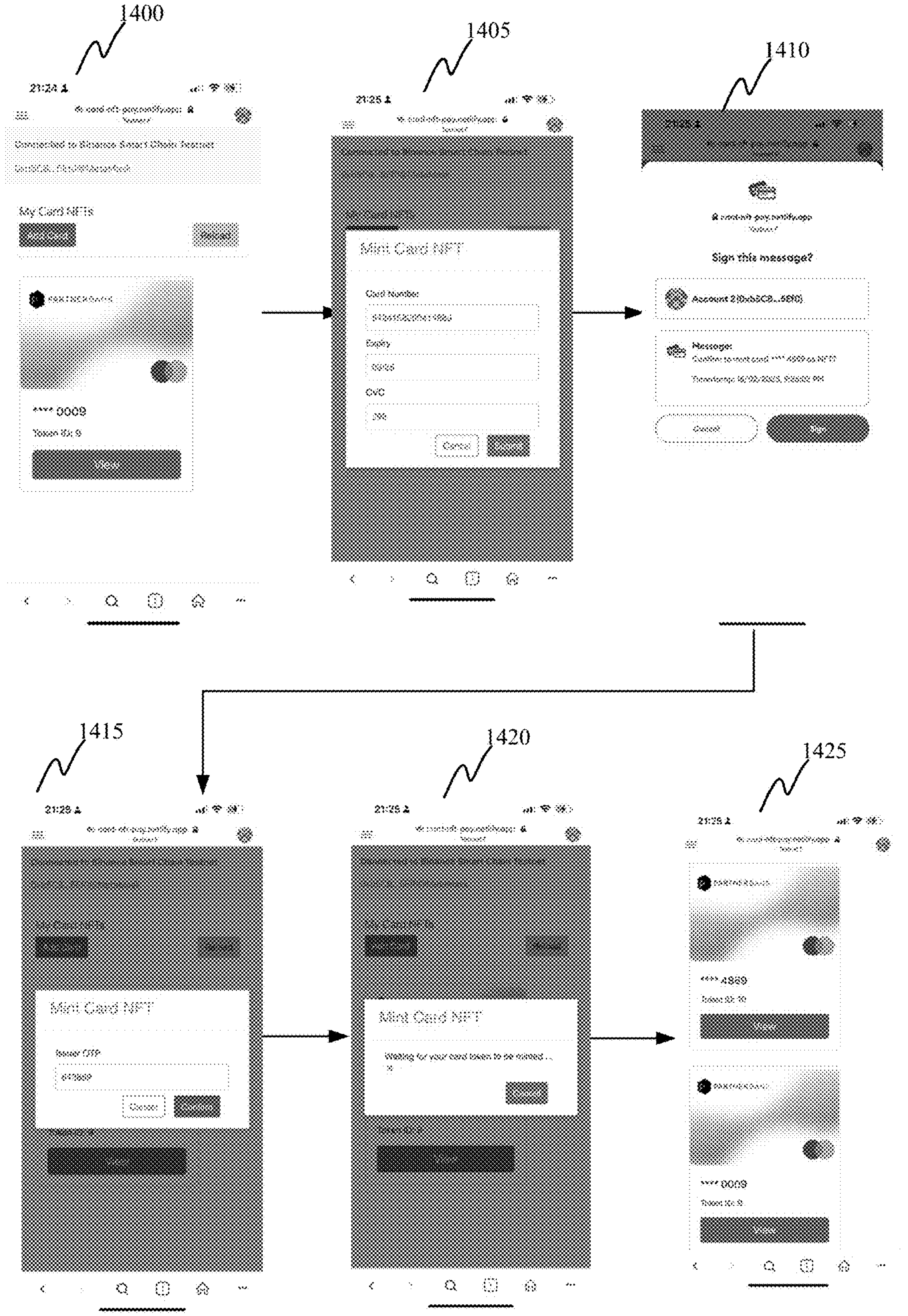
FIG. 14 illustrates graphical user interface snapshots of an example scenario of minting a financial NFT from a PSP application.

FIG. 14 illustrates graphical user interface snapshots of an example scenario of minting a financial NFT from a PSP application. Referring to FIG. 14, in the example scenario, a user wants to add a payment card to their web3 wallet by minting a financial NFT for Web3 and metaverse transactions. The minting can be performed, for example, using the signal flow for minting a financial NFT described with respect to FIG. 3

Through a PSP application displaying the contents of the user's web3 wallet, the user selects to add a payment card, as shown in snapshot 1400. The user adds payment card details (e.g., credit card, debit card, etc.) of the desired payment card, as shown in snapshot 1405.

The user is then asked to confirm that they would like to mint the payment card as a financial NFT by electronically signing the message, as shown in snapshot 1410. In some cases, the user electronically signs when entering payment card details.

The user is asked to enter the OTP (as shown in snapshot 1415) and a message is displayed notifying the user that the payment card is being minted, as show in snapshot 1420. Once the payment card is successfully minted, the financial NFT representing the tokenized payment card is added and displayed in the user's web3 wallet, as shown in snapshot 1425.

Figure 15:
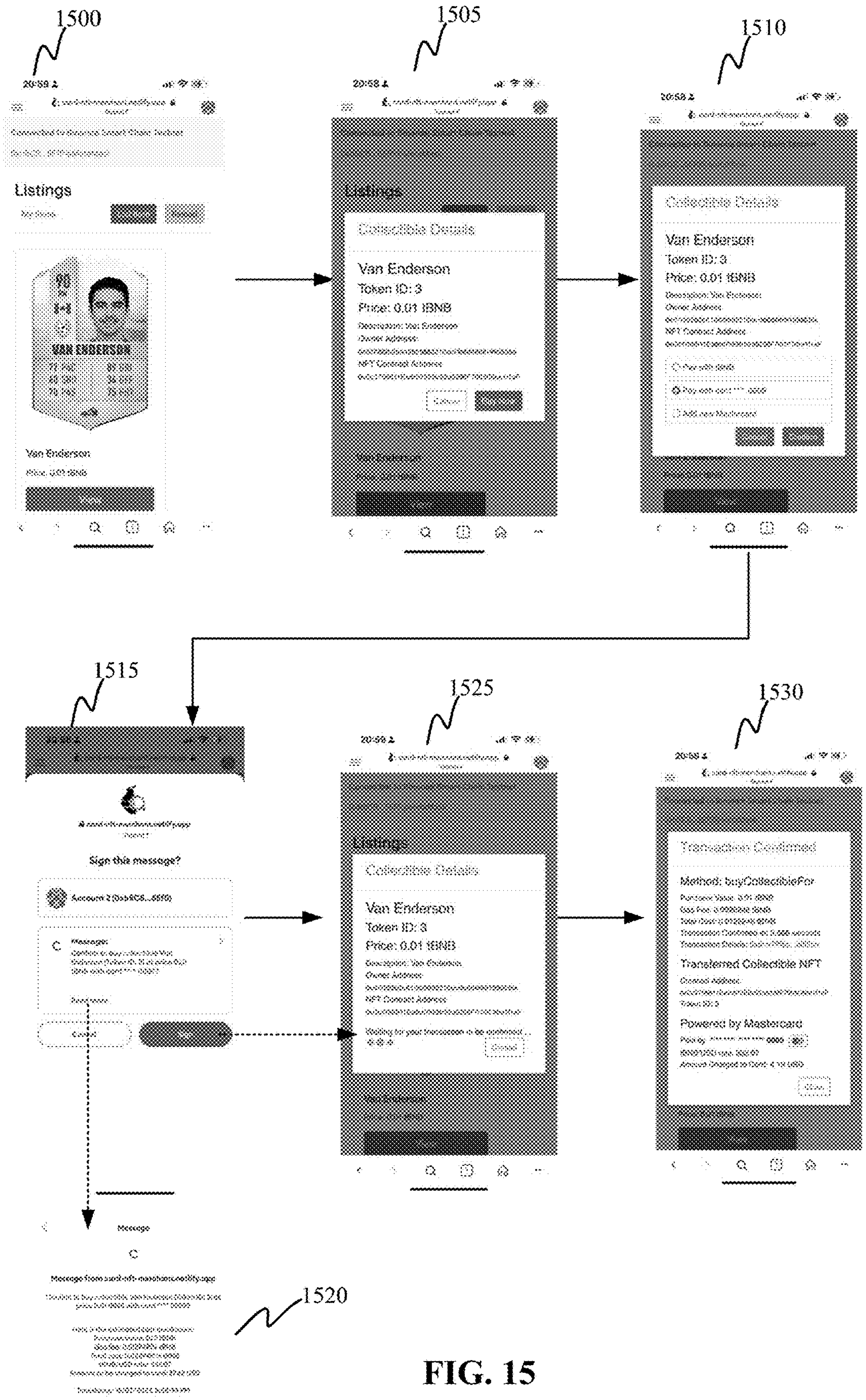
FIG. 15 illustrates graphical user interface snapshots of an example scenario of paying for a NFT with a financial NFT from a merchant DAPP, where the NFT is priced in a native currency.

FIG. 15 illustrates graphical user interface snapshots of an example scenario of paying for an NFT with a financial NFT from a merchant DAPP, where the NFT is priced in a native currency. Referring to FIG. 15, a user can purchase a Van Enderson NFT through a merchant dApp using a financial NFT.

The user can browse listings available for purchase through the merchant dApp, as shown in snapshot 1500. In the illustrative example, the Van Enderson NFT is shown and is priced in the native currency (tBNB). The user can select to view each of the listings in more detail.

When the user selects to view the Van Enderson NFT in more detail, collectible details for the Van Enderson NFT are displayed, as shown in snapshot 1505. In the illustrative example, the collectible details indicate that the Van Enderson NFT has a purchase price of 0.01 tBNB.

When the user requests to purchase the Van Enderson NFT, payment options for the user are displayed, as shown in snapshot 1510. In the illustrative example, the user has the option of paying with tBNB, paying with a payment card, or adding a new payment card.

When the user selects the option for paying with a payment card, an offer from a payment provider is displayed, as shown in snapshot 1515. In the illustrative example, the offer from the payment provider includes message 1520, which provides the user with an estimated cost breakdown for the purchase of the Van Enderson NFT. The information in the estimated cost breakdown shown in message 1520 includes "Purchase value: 0.01 tBNB", "Gas fee: 0.01294806 tBNB", "Total cost: 0.02294806 tBNB", "tBNB/USD rate: 332.07", and "Amount to be charged to card: $7.62 USD".

The user is then asked to confirm the purchase of the Van Enderson NFT by signing the message 1520. Once the message 1520 is signed, a notification is displayed notifying the user that the system is waiting for the transaction to be confirmed, as shown in snapshot 1525. If the transaction is successful, the user is shown the details of the confirmed transaction, as shown in snapshot 1530. In the illustrative example, when the transaction was confirmed, the actual cost breakdown includes "Purchase value: 0.01 tBNB", "Gas fee: 0.0026246 tBNB", "Total cost: 0.0126246 tBNB", "tBNB/USD rate: 332.07", and "Amount to be charged to card: $4.19 USD". As can be seen, the actual amount charged to the payment card ($4.19 USD) was less than the estimated amount charged to the payment card ($7.62 USD).

Figure 16:
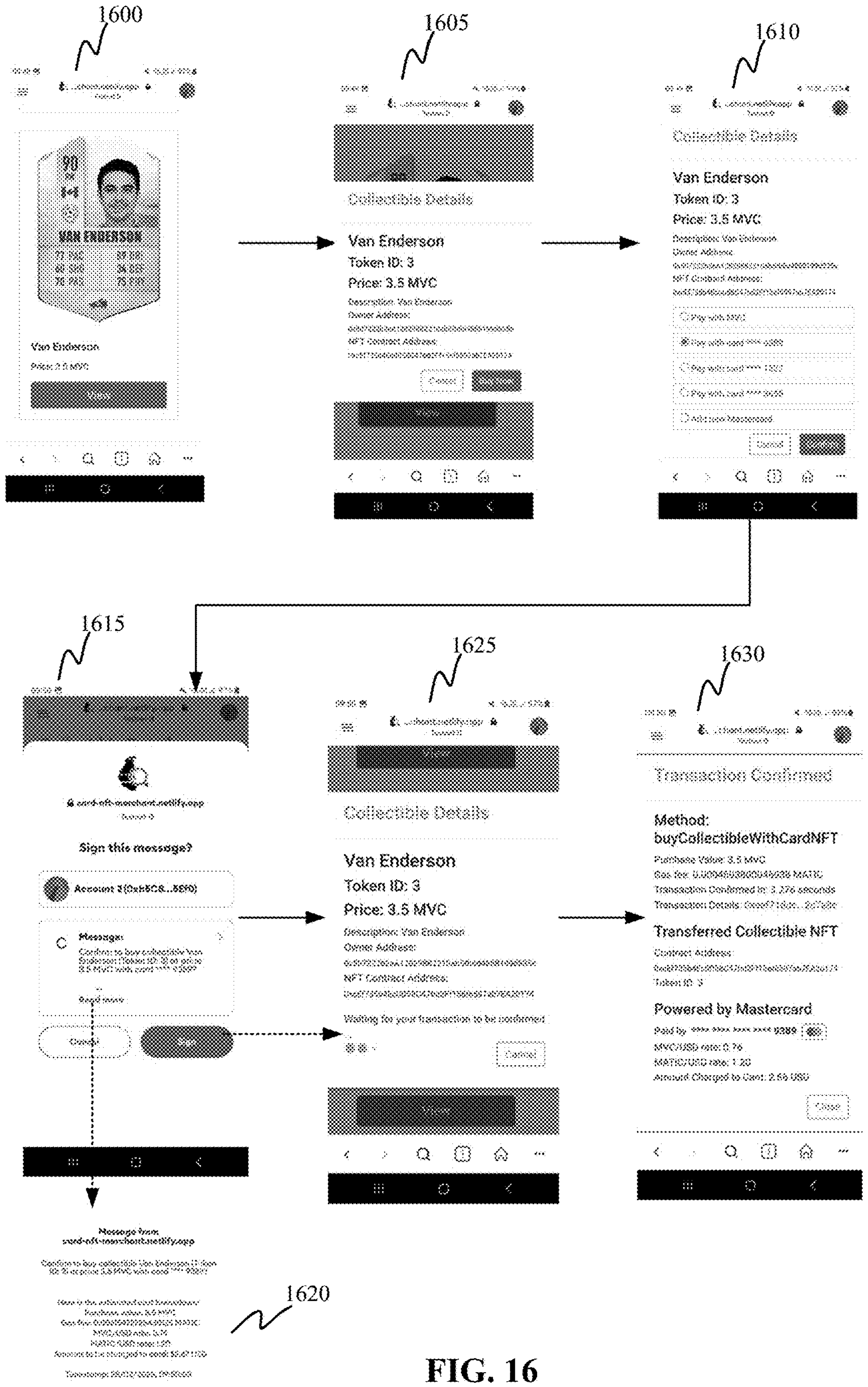
FIG. 16 illustrates an example scenario of paying for a NFT with a financial NFT from a merchant DAPP, where the NFT is priced in an ERC-20 Token.

FIG. 16 illustrates graphical user interface snapshots of an example scenario of paying for a NFT with a financial NFT from a merchant dApp, where the NFT is priced in an ERC-20 Token. Referring to FIG. 16, a user can purchase a Van Enderson NFT through a merchant dApp using a financial NFT.

The user can browse listings available for purchase through the merchant dApp, as shown in snapshot 1600. In the illustrative example, the Van Enderson NFT is shown and is priced in the ERC-20 Token-Metaverse Coin (MVC). The user can select to view each of the listings in more detail.

When the user selects to view the Van Enderson NFT in more detail, collectible details for the Van Enderson NFT are displayed, as shown in snapshot 1605. In the illustrative example, the collectible details indicate that the Van Enderson NFT has a purchase price of 3.5 MVC.

When the user requests to purchase the Van Enderson NFT, payment options for the user are displayed, as shown in snapshot 1610. In the illustrative example, the user has the option of paying with MVC, paying with one of three payment cards shown, or adding a new payment card.

When the user selects the option for paying with a payment card, an offer from a payment provider is displayed, as shown in snapshot 1615. In the illustrative example, the offer from the payment provider includes message 1620, which provides the user with an estimated cost breakdown for the purchase of the Van Enderson NFT. The information in the estimated cost breakdown shown in message 1620 includes "Purchase value: 3.5 MVC", "Gas fee: 0.00615472725430125 MATIC", "MVC/USD rate: 0.76", "MATIC/USD rate: 1.20", and "Amount to be charged to card: $2.67 USD".

The user is then asked to confirm the purchase of the Van Enderson NFT by signing the message 1620. Once the message 1620 is signed, a notification is displayed notifying the user that the system is waiting for the transaction to be confirmed, as shown in snapshot 1625. If the transaction is successful, the user is shown the details of the confirmed transaction, as shown in snapshot 1630. In the illustrative example, when the transaction was confirmed, the actual cost breakdown includes "Purchase value: 3.5 MVC", "Gas fee: 0.004693800046938 MATIC", "MVC/USD rate: 0.76", "MATIC/USD rate: 1.20", and "Amount to be charged to card: $2.66 USD". As can be seen, the actual amount charged to the payment card ($2.67 USD) was less than the estimated amount charged to the payment card ($2.66 USD).

Figure 17:
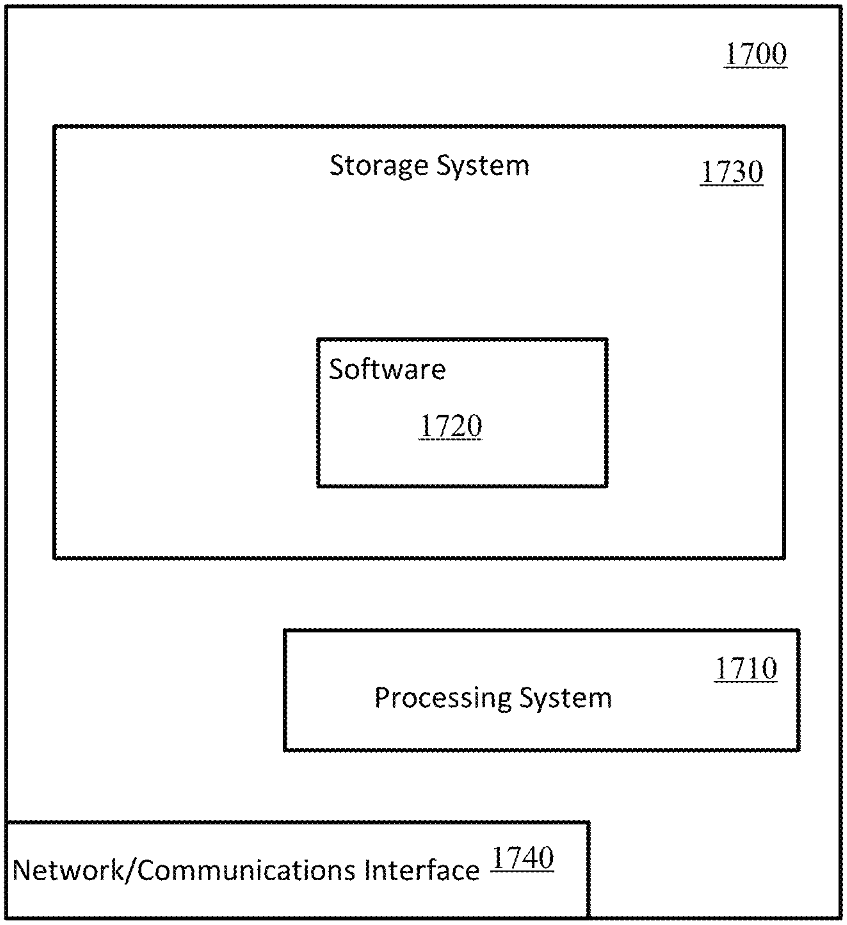
FIG. 17 illustrates components of a computing system that may be used in certain embodiments described herein.

FIG. 17 illustrates components of a computing system that may be used in certain embodiments described herein. Referring to FIG. 17, system 1700 may be implemented within a single computing device or distributed across multiple computing devices or sub-systems that cooperate in executing program instructions. The system 1700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1700 can include a processing system 1710, which may include one or more processors and/or other circuitry that retrieves and executes software 1720 from storage system 1730. Processing system 1710 may be implemented within a single processing device but may also be distributed across multiple processing devices or sub-systems that cooperate in executing program instructions.

Storage system(s) 1730 can include any computer readable storage media readable by processing system 1710 and capable of storing software 1720. Storage system 1730 may be implemented as a single storage device but may also be implemented across multiple storage devices or sub-systems co-located or distributed relative to each other. Storage system 1730 may include additional elements, such as a controller, capable of communicating with processing system 1710. Storage system 1730 may also include storage devices and/or sub-systems on which data is stored. System 1700 may access one or more storage resources in order to access information to carry out any of the processes indicated by software 1720.

Software 1720, including routines for performing processes, may be implemented in program instructions and among other functions may, when executed by system 1700 in general or processing system 1710 in particular, direct the system 1700 or processing system 1710 to operate as described herein.

In embodiments where the system 1700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 1740 may be included, providing communication connections and devices that allow for communication between system 1700 and other computing systems (not shown) over a communication network or collection of networks (not shown) or the air.

In some embodiments, system 1700 may host one or more virtual machines.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:

receiving, at a service provider system from a web3 wallet of a first party using a wallet connect protocol, a cryptocurrency transaction amount for a transaction between the first party and a second party, a public address of the second party, and a financial card non-fungible token (NFT) of the first party to be used for payment of the transaction;

identifying the financial NFT as representing a tokenized payment card of an issuer;

obtaining an estimated exchange amount in fiat currency required for the cryptocurrency transaction amount, wherein the estimated exchange amount comprises an estimated gas fee;

communicating, by the service provider system to the issuer using a specific standardized message format, a pre-authorization request for a pre-authorization of the estimated exchange amount;

receiving, at the service provider system from the issuer, a pre-authorization response message that includes the pre-authorization for the estimated exchange amount;

generating, by the service provider system, a transaction payload by obtaining payment credentials for the financial NFT using a smart contract on a blockchain distributed ledger;

communicating, by the service provider system to the web3 wallet using the wallet connect protocol, the transaction payload;

receiving, at the service provider system, a transaction hash indicating the transaction payload is signed and the transaction payload has been submitted to the blockchain distributed ledger;

in response to receiving the transaction hash indicating the transaction payload is signed and the transaction payload has been submitted to the blockchain distributed ledger, obtaining, by the service provider system from a crypto exchange server, confirmation of a fiat currency to cryptocurrency exchange of the estimated exchange amount, wherein the confirmation includes an actual fiat currency amount and an actual gas fee;

communicating, by the service provider system to the issuer, a capture request of the pre-authorization for the actual fiat currency amount;

receiving, at the service provider system from the issuer, a capture response message that the fiat currency of the actual fiat currency amount is captured; and providing, by the service provider system to the second party based on the smart contract, a confirmation message including a confirmation that the transaction between the first party and the second party is complete and a payment transaction hash for a transfer of the cryptocurrency transaction amount for the transaction to the public address of the second party.

2. The method of claim 1, wherein obtaining the estimated exchange amount comprises:

communicating, to a cryptocurrency exchange, a request for the estimated exchange amount, the request comprising the cryptocurrency transaction amount; and receiving, from the cryptocurrency exchange, the estimated exchange amount in the fiat currency required for the cryptocurrency transaction amount.

3. The method of claim 1, wherein obtaining the confirmation of the fiat currency to cryptocurrency exchange of the estimated exchange amount comprises:

communicating, to a cryptocurrency exchange, a request to perform the fiat currency to cryptocurrency exchange of the estimated exchange amount; and receiving, from the cryptocurrency exchange, an exchange transaction hash for the fiat currency to cryptocurrency exchange of the estimated exchange amount.

4. The method of claim 1, wherein obtaining the payment credentials for the financial NFT comprises:

communicating, to a financial NFT service, a request for payment credentials for the financial NFT; and receiving, from the financial NFT service, the payment credentials for the financial NFT.

5. The method of claim 1, wherein the transaction between the first party and the second party is a person-to-merchant (P2M) web3 transaction, wherein the first party is a consumer and the second party is a merchant.

6. The method of claim 1, wherein the transaction between the first party and the second party is a person-to-person (P2P) payment, wherein the first party is a sender and the second party is a receiver.

7. The method of claim 1, wherein the pre-authorization of the estimated exchange amount comprises a buffer amount, and wherein the blockchain distributed ledger comprises a decentralized database managed by a plurality of users across a plurality of nodes.

8. One or more computer readable storage media having instructions stored thereon that, when executed by a processing system, direct the processing system to perform a method comprising:

receiving, at a service provider system from a web3 wallet of a first party using a wallet connect protocol, a cryptocurrency transaction amount for a transaction between the first party and a second party, a public address of the second party, and a financial card non-fungible token (NFT) of the first party to be used for payment of the transaction;

identifying the financial NFT as representing a tokenized payment card of an issuer;

obtaining an estimated exchange amount in fiat currency required for the cryptocurrency transaction amount, wherein the estimated exchange amount comprises an estimated gas fee;

communicating, by the service provider system to the issuer using a specific standardized message format, a pre-authorization request for a pre-authorization of the estimated exchange amount;

receiving, at the service provider system from the issuer, a pre-authorization response message that includes the pre-authorization for the estimated exchange amount;

generating, by the service provider system, a transaction payload by obtaining payment credentials for the financial NFT, using a smart contract on a blockchain distributed ledger;

communicating, by the service provider system to the web3 wallet using the wallet connect protocol, the transaction payload;

receiving, at the service provider system, a transaction hash indicating the transaction payload is signed and the transaction payload has been submitted to the blockchain distributed ledger;

in response to receiving the transaction hash indicating the transaction payload is signed and the transaction payload has been submitted to the blockchain distributed ledger, obtaining, by the service provider system from a crypto exchange server, confirmation of a fiat currency to cryptocurrency exchange of the estimated exchange amount, the confirmation comprising an actual fiat currency amount and an actual gas fee;

communicating, by the service provider system to the issuer, a capture request of the pre-authorization for the actual fiat currency amount;

receiving, at the service provider system from the issuer, a capture response message that the fiat currency of the actual fiat currency amount is captured; and providing, by the service provider system to the second party based on the smart contract, a confirmation message including a confirmation that the transaction between the first party and the second party is complete and a payment transaction hash for a transfer of the cryptocurrency transaction amount for the transaction to the public address of the second party.

9. The media of claim 8, wherein obtaining the estimated exchange amount comprises:

communicating, to a cryptocurrency exchange, a request for the estimated exchange amount, the request comprising the cryptocurrency transaction amount; and receiving, from the cryptocurrency exchange, the estimated exchange amount in the fiat currency required for the cryptocurrency transaction amount.

10. The media of claim 8, wherein obtaining the confirmation of the fiat currency to cryptocurrency exchange of the estimated exchange amount comprises:

communicating, to a cryptocurrency exchange, a request to perform the fiat currency to cryptocurrency exchange of the estimated exchange amount; and receiving, from the cryptocurrency exchange, an exchange transaction hash for the fiat currency to cryptocurrency exchange of the estimated exchange amount.

11. The media of claim 8, wherein obtaining the payment credentials for the financial NFT comprises:

communicating, to a financial NFT service, a request for payment credentials for the financial NFT; and receiving, from the financial NFT service, the payment credentials for the financial NFT.

12. The media of claim 8, wherein the transaction between the first party and the second party is a person-to-merchant (P2M) web3 transaction, wherein the first party is a consumer and the second party is a merchant.

13. The media of claim 8, wherein the transaction between the first party and the second party is a person-to-person (P2P) payment, wherein the first party is a sender and the second party is a receiver, and wherein the transaction is performed on a P2P blockchain network supported by the blockchain distributed ledger.

14. A system comprising:

a processing system;

one or more storage media; and instructions stored on the one or more storage media that, when executed by the processing system, direct the processing system to at least:

receive, at a service provider system from a web3 wallet of a first party using a wallet connect protocol, a cryptocurrency transaction amount for a transaction between the first party and a second party, a public address of the second party, and a financial card non-fungible token (NFT) of the first party to be used for payment of the transaction;

identify the financial NFT as representing a tokenized payment card of an issuer;

obtain an estimated exchange amount in fiat currency required for the cryptocurrency transaction amount, wherein the estimated exchange amount comprises an estimated gas fee;

communicate, by the service provider system to the issuer using a specific standardized message format, a pre-authorization request for a pre-authorization of the estimated exchange amount;

receive, at the service provider system from the issuer, a pre-authorization response message that includes the pre-authorization for the estimated exchange amount;

generate, by the service provider system, a transaction payload by obtaining payment credentials for the financial NFT using a smart contract on a blockchain distributed ledger;

communicate, by the service provider system to the web3 wallet using the wallet connect protocol, the transaction payload;

receiving, at the service provider system, a transaction hash indicating the transaction payload is signed and the transaction payload has been submitted to the blockchain distributed ledger;

in response to receiving the transaction hash indicating the transaction payload is signed and the transaction payload has been submitted to the blockchain distributed ledger, obtain, by the service provider system from a crypto exchange server, confirmation of a fiat currency to cryptocurrency exchange of the estimated exchange amount, the confirmation comprising an actual fiat currency amount and an actual gas fee;

communicate, by the service provider system to the issuer, a capture request of the pre-authorization for the actual fiat currency amount;

receive, at the service provider system from the issuer, a capture response message that the fiat currency of the actual fiat currency amount is captured; and provide, by the service provider system to the second party based on the smart contract, a confirmation message including a confirmation that the transaction between the first party and the second party is complete and a payment transaction hash for a transfer of the cryptocurrency transaction amount for the transaction to the public address of the second party.

15. The system of claim 14, wherein the instructions that direct the processing system to obtain the estimated exchange amount direct the processing system to at least:

communicate, to a cryptocurrency exchange, a request for the estimated exchange amount, the request comprising the cryptocurrency transaction amount; and receive, from the cryptocurrency exchange, the estimated exchange amount in the fiat currency required for the cryptocurrency transaction amount.

16. The system of claim 14, wherein the instructions that direct the processing system to obtain the confirmation of the fiat currency to cryptocurrency exchange of the estimated exchange amount direct the processing system to at least:

communicate, to a cryptocurrency exchange, a request to perform the fiat currency to cryptocurrency exchange of the estimated exchange amount; and receive, from the cryptocurrency exchange, an exchange transaction hash for the fiat currency to cryptocurrency exchange of the estimated exchange amount.

17. The system of claim 14, wherein the instructions that direct the processing system to obtain the payment credentials for the financial NFT direct the processing system to at least:

communicate, to a financial NFT service, a request for payment credentials for the financial NFT; and receive, from the financial NFT service, the payment credentials for the financial NFT.

18. The system of claim 14, wherein the transaction between the first party and the second party is a person-to-merchant (P2M) web3 transaction, wherein the first party is a consumer and the second party is a merchant.

19. The system of claim 14, wherein the transaction between the first party and the second party is a person-to-person (P2P) payment, wherein the first party is a sender and the second party is a receiver.

20. The system of claim 14, wherein the pre-authorization of the estimated exchange amount comprises a buffer amount.

* * * * *